United States Patent [19]
Kasson et al.

[11] Patent Number: 5,751,926
[45] Date of Patent: May 12, 1998

[54] FUNCTION APPROXIMATION USING A CENTERED CUBIC PACKING WITH TETRAGONAL DISPHENOID EXTRACTION

[75] Inventors: James Matthews Kasson, Menlo Park; Sigfredo Ismael Nin, Morgan Hill; Wilfred Edmund Plouffe, Jr., San Jose; Duaine Wright Pryor, Jr., Berkeley, all of Calif.

[73] Assignee: International Business Machines Corporation, Armonk, N.Y.

[21] Appl. No.: 996,306

[22] Filed: Dec. 23, 1992

[51] Int. Cl.$^6$ ............................................. G03F 03/08
[52] U.S. Cl. .................. 395/119; 364/723; 364/577
[58] Field of Search ................................. 364/514, 723, 364/577

[56] References Cited

U.S. PATENT DOCUMENTS

| | | | |
|---|---|---|---|
| 4,075,663 | 2/1978 | Wellendorf | 358/283 |
| 4,275,413 | 6/1981 | Sakamoto et al. | 358/80 |
| 4,334,240 | 6/1982 | Franklin | 358/78 |
| 4,350,996 | 9/1982 | Rosenfeld | 358/75 |
| 4,456,924 | 6/1984 | Rosenfeld | 358/75 |
| 4,462,083 | 7/1984 | Schwefel | 364/577 |
| 4,463,374 | 7/1984 | Thompson | 358/78 |
| 4,464,677 | 8/1984 | Kuhn et al. | 358/75 |
| 4,468,693 | 8/1984 | Fujita et al. | 358/78 |
| 4,477,833 | 10/1984 | Clark et al. | 358/80 |
| 4,500,919 | 2/1985 | Schreiber | 358/78 |
| 4,511,989 | 4/1985 | Sakamoto | 364/723 |

(List continued on next page.)

FOREIGN PATENT DOCUMENTS

| | | | |
|---|---|---|---|
| 1595122 | 8/1981 | Japan . | |
| 2-206973 | 2/1990 | Japan . | |
| 2-226869 | 2/1990 | Japan . | |
| 9-89-513 | 3/1991 | Japan | 265309/89 |

OTHER PUBLICATIONS

"Color Correction Technique for Hard Copies by 4–Neighbors Interpolation Method", Kanamori et al., Journal of Imaging Science and Technology, vol. 36, No. 1, Jan–Feb 1992, pp. 73–80.

"The Gamut of Real Surface Colours", M.R. Pointer, Research Division Kodak Limited, Color Research Application, vol. 5, No. 3, Fall 1980, pp. 145–155.

"A Novel Color Transformation Algorithm and It's Application" by Katsuhiro et.;Image Processing Algorithm and Tech.; vol. 1244; 1990.

*Primary Examiner*—James P. Trammell
*Assistant Examiner*—Craig Steven Miller
*Attorney, Agent, or Firm*—Baker, Maxham, Jester & Meador

[57] ABSTRACT

The invention provides approximation of the value of a function of three variables. The invention embraces three processes: function domain packing, polyhedron extraction, and volumetric interpolation. The processes are applied to a mathematical function to calculate an approximation for the function range output value at a point which has been arbitrarily selected from the input domain of the function. Function domain packing utilizes two interlocked domain subdivisions. A first subdivision and a second subdivision each divide the domain space into rectangular solids. Each subdivision is accomplished by means of a plurality of planes of constant value corresponding to each of the input dimensions. After a function domain has been so subdivided, a tetrahedral volume is extracted from the fraction domain space. This tetrahedral volume is defined by two points from the first subdivision and two points from the second subdivision. The third process of the invention is a function approximation method using volumetric interpolation. If the fraction domain is subdivided according to the present invention, a continuous approximation of function range output values will result. The volumetric interpolation process commences by subdividing the extracted tetrahedron into four sub-tetrahedra. The subdivision is implemented by drawing lines from each of the vertices of the extracted tetrahedron to the target evaluation point to form four sub-tetrahedra.

13 Claims, 15 Drawing Sheets

U.S. PATENT DOCUMENTS

| | | | |
|---|---|---|---|
| 4,561,016 | 12/1985 | Jung et al. | 358/76 |
| 4,639,770 | 1/1987 | Jung et al. | 358/76 |
| 4,670,780 | 6/1987 | McManus et al. | 358/80 |
| 4,717,954 | 1/1988 | Fujita et al. | 358/80 |
| 4,729,098 | 3/1988 | Cline et al. | 364/414 |
| 4,751,742 | 6/1988 | Meeker | 382/41 |
| 4,758,885 | 7/1988 | Sasaki et al. | 358/80 |
| 4,780,756 | 10/1988 | Shiota et al. | 358/78 |
| 4,805,013 | 2/1989 | Dei et al. | 358/80 |
| 4,829,587 | 5/1989 | Glazer et al. | 382/47 |
| 4,837,613 | 6/1989 | Paxton et al | 358/75 |
| 4,837,722 | 6/1989 | Sara | 364/723 |
| 4,839,721 | 6/1989 | Abdulwahab et al. | 358/80 |
| 4,839,722 | 6/1989 | Barry et al. | 358/80 |
| 4,862,255 | 8/1989 | Takanaski et al. | 358/80 |
| 4,864,357 | 9/1989 | Matsunawa et al. | 355/32 |
| 4,876,509 | 10/1989 | Perlmutter | 324/309 |
| 4,879,594 | 11/1989 | Stansfield et al. | 358/80 |
| 4,893,181 | 1/1990 | Yeomans | 358/80 |
| 4,894,794 | 1/1990 | Shenk | 364/723 |
| 4,901,258 | 2/1990 | Akiyama | 364/577 |
| 4,941,038 | 7/1990 | Walowit | 358/80 |
| 4,941,039 | 7/1990 | E'Errico | 358/80 |
| 4,945,500 | 7/1990 | Deering | 364/522 |
| 4,959,711 | 9/1990 | Hung et al. | 358/80 |
| 4,972,329 | 11/1990 | Breger | 364/529 |
| 4,974,069 | 11/1990 | Shimomura | 358/75 |
| 4,992,861 | 2/1991 | D'Errico | 358/75 |
| 4,992,862 | 2/1991 | Gabor | 358/76 |
| 5,001,651 | 3/1991 | Rehme et al. | 364/518 |
| 5,025,404 | 6/1991 | Jannssen et al. | 364/723 |
| 5,025,405 | 6/1991 | Swanson | 364/723 |
| 5,054,097 | 10/1991 | Flinois et al. | 382/44 |
| 5,055,923 | 10/1991 | Kitagawa et al. | 358/75 |
| 5,072,305 | 12/1991 | Numakura et al. | 358/298 |
| 5,077,604 | 12/1991 | Kivolowitz et al. | 358/75 |
| 5,097,518 | 3/1992 | Scott et al. | 382/47 |
| 5,101,283 | 3/1992 | Seki et al. | 358/456 |
| 5,111,286 | 5/1992 | MacDonald et al. | 358/75 |

FUNCTION APPROXIMATION USING A CENTERED CUBIC PACKING WITH TETRAGONAL DISPHENOID EXTRACTION

BACKGROUND OF THE INVENTION

1. Field of the Invention

This invention relates generally to method and means for evaluating mathematical functions of many variables, and more specifically to a method and a means for function evaluation which select sample points in a continuous function domain by subdividing the domain space into a set of contiguous tetrahedra, obtain a number of sample points in response to an input function value to be approximated, and interpolate to an approximate value using the sample points and the input function value.

2. Description of the Prior Art

Many modern-day processes require the evaluation of one or more mathematical functions. These functions frequently involve a multiplicity of variables interrelated by relatively complex mathematical expressions. Oftentimes, the overall efficiency of a process is determined by the relative ease or difficulty with which a function may be evaluated. For instance, in the field of color imaging, it is often desired to convert a color image from a first color space to a second color space. The first color space may be for an image representation stored in a computer file, and the second color space may be for specification of color created on paper by means of printer inks.

During the implementation of a process, it is generally more important to provide an efficient function evaluation technique, as opposed to providing a function evaluation technique optimized for maximum accuracy. For example, during the process of color image conversion, a quick, expedient evaluation of color image functions is much more important than a completely accurate representation of the converted color image. Efficiency is of paramount importance in this context because a common design goal of many image processing systems is to provide rapid processing capability. Accuracy is not a critical design parameter because the human eye can not distinguish or can compensate for minor imaging errors. The characteristics of human visual perception generally allow for the existence of a known bounded error in image rendering. Although the importance of efficiency relative to accuracy has been described in conjunction with color imaging systems, a similar situation exists across a broad spectrum of other process applications as well.

In some process applications, the output of a function may be sampled, but the function itself is unknown. For example, consider the conversion of an image from the color space of a computer file to the surface of a newspaper. The actual colors produced by the printing ink interacting with the paper are difficult or impossible to accurately quantify. The factors resulting in the appearance of a given color on paper are represented by an unknown function, even though the value of the function can be sampled at various intervals. In this scenario, an accurate representation of the imaging information is not at all critical, and emphasis may instead be placed on data processing speed.

Many existing processes involve mathematical functions having extensive domains. It is generally impractical to sample the output of the function at all possible sample values. For example, FIG. 1 illustrates the domain of a mathematical function representing the color of an object in the context of a color image processing system. State of the art color imaging systems represent a color image as a regular array of spots, generally referred to as pixels. Each pixel is assigned a color represented by the coordinates of the color in a three dimensional space. In an additive color environment (i.e., a cathode-ray tube display), any color may be represented by a given combination of the three primary colors of red, green, and blue. With reference to FIG. 1, the value of red may be represented along the X axis 12, green along the Y axis 14, and blue along the Z axis 16. Each coordinate may be of arbitrary precision, but coordinates are generally represented using 8-bit values. In this manner, each pixel may be assigned one of 224 different colors. Therefore, the domain of the mathematical function representing pixel color is quite extensive.

The mathematical function accepts input values within the domain of the function, and produces output values corresponding to the input values. The sequence of mathematical operations carried out by the function are determined by the process to be implemented. To print a color image displayed on a cathode-ray tube, the image must be converted from additive to subtractive form. As previously described, the cathode-ray tube image is stored as a pixel-by-pixel representation specifying particular quantities of the colors red, green, and blue. For subtractive color applications, such as printing, the three primary colors are cyan (blue-green), magenta and yellow with black used as an additional or optional color for increased density (darkness) or decreased total ink usage. Accordingly, a function must be determined for the purpose of converting pixel color representations into known quantities of colored printer inks, typically with the amount expressed as an integer in the range of 0 to 255 for each of cyan, magenta, yellow and black. The function accepts input values for the variables red, green, and blue, and produces output values which represent quantities of cyan, magenta, yellow, and black. Other color spaces in use as either input or output spaces include the calorimetric spaces which represent color based on the tristimulus values that represent a standard observer as defined by the Commission Internationale de l'Eclairage. CIE L*a*b*, CIE L*u*v*, and CIE XYZ are three such spaces.

For many processes, it is impractical to define a function in analytical form. In the context of color image conversion, it would be very difficult to develop a working analytical model for the purpose of converting a cathode-ray tube image representation into a form suitable for color printing on newspaper media. If the printer inks offered a perfectly linear response, and if the paper was perfectly white, then the function for the conversion of the color image could be specified analytically. However, as a practical matter, the inks have a nonlinear response, and the paper is off-white. Consequently, the print function is best represented by using measurements accumulated for a plurality of print samples. There are $2^{24}$ points in the domain of the print color function which could be sampled, so it would be prohibitively time-consuming and storage intensive to measure and store all of these values. Rather, the function may be approximated using a smaller set of measured domain values (sample points), and using interpolation to compute the approximate values for all of the other domain values.

FIG. 1 illustrates the concept of taking sample points at regularly-spaced intervals throughout the display-color space, which is the domain of the print-color function. Each sample point is represented by an ordered triplet (R,G,B) which corresponds to values along the red (R), green (G), and blue (B) axes of display-color space. In the present example, samples are taken at points 18, 20, 22, 24, 26, 28, 30, 32, 34, 36, 38, 40, 42, 44, 46, and 48. Accordingly, the sample points form a rectangular grid throughout the domain of the function, such that the rectangular grid is comprised of a plurality of rectangular volumes 10.

Many existing linear interpolation techniques store the coordinates of the sample points 18, 20, 22, 24, 26, 28, 30, 32, 34, 36, 38, 40, 42, 44, 46, and 48 in one or more interpolation tables. The interpolation tables associate each domain sample point coordinate with a function range output value. The domain sample points are generally situated in a first color space, such as red-green-blue, whereas the range output values are situated in a second color space, such as cyan-magenta-yellow.

The accuracy of a given interpolation technique is determined in part by the size of the interpolation tables. In approximating a continuous function, increasing the number of entries in the tables and decreasing the distance between the entries can be used to provide virtually any desired level of function approximation accuracy. However, this approach to increasing system accuracy is very expensive in practice. Table storage and table indexing structures consume large blocks of memory, especially in the context of three-or higher-dimensional functions. Approximation schemes which produce accurate results with relatively small tables are preferred over methods which require large tables to achieve the same accuracy. Accordingly, it would be desirable to develop an approximating technique which produces accurate answers with relatively small tables.

The overall efficiency of a given approximation technique is often determined by the complexity of mathematical calculations required to perform an approximation. The cost of performing the calculations necessary to produce the result should be minimized. Many prior art systems require the implementation of numerous memory access operations to read table values from a relatively large number of memory locations. One way to minimize the complexity of the mathematical calculations is to reduce the number of locations in the table which the approximation equipment uses to compute the result. By contrast, the complexity of the calculations required to load the interpolation tables is generally not critical. The loading of the interpolation table is carried out infrequently as compared with the number of times the table is used to approximate the function. Therefore, it would be desirable to develop an interpolation technique which minimizes the cost of performing the calculations and the number of memory locations which must be accessed, even if the computational complexity of loading the interpolation table is increased.

State of the art function approximation techniques produce answers which are slightly in error. For system applications such as color image processing, these small errors are generally acceptable. However, some approximation techniques produce discontinuous results in the output range of the function when the domain is presented with continuous input points. Such discontinuous results may produce visible artifacts,, because the human eye is more sensitive to differences in color and/or intensity than it is to the absolute value of color and/or intensity. If the magnitude of the discontinuity produced by the approximating scheme exceeds the just-noticeable difference, visible contours will appear in the areas of the image that are supposed to be perfectly smooth. Consequently, it would be desirable to develop an efficient function approximation technique which provides a continuous range output in response to a continuous domain input.

Presently existing function approximation techniques which utilize interpolation tables may be categorized by considering the manner in which the techniques perform each of three subfunctions. The subfunctions are (1) the subdivision of the function domain to select sample domain input points, (2) the extraction of appropriate sample domain input points corresponding to an arbitrarily selected point from within the function domain, and (3) the actual mathematical interpolation process.

The operation of selecting sample points in the continuous input domain of the function can be termed packing or subdividing. The function is evaluated at these sample points and the evaluation results are saved in a table for subsequent utilization by an interpolation process. The selection of sample points often has a geometrical interpretation: it may be conceptualized as the division of the input domain of the function into a set of contiguous n-dimensional polyhedrons, with the sample points being represented as the polyhedron vertices. For example, a function domain consisting of a three-dimensional rectangular solid can be subdivided into a set of rectangular solids along three mutually orthogonal sets of parallel planes.

Although the division of the function domain into rectangular volumes is a common technique employed by many existing interpolation techniques, it is not an absolute requirement. The function domain may be divided into volumes having nonrectangular geometrical configurations to enhance the efficiency of the interpolation technique in the context of specific system applications. Furthermore, the packing need not be conducted at regular intervals. For example, it may be advantageous to use smaller rectangular solids in areas of the function domain having relatively high amounts of curvature. However, it is necessary that the collection of solids chosen for packing be non-overlapping and completely fill the portion of the function domain for which approximations are desired.

The process of selecting a small number of sample points to be used in computing a given approximation can be termed extraction. Since the sample points typically represent polyhedra vertices, extraction refers to the process of identifying the polyhedron containing the arbitrarily selected point for which an approximation is desired. The arbitrarily selected point may be called the target evaluation point. In the context of an interpolation scheme utilizing tables, the extraction process generally involves extracting the desired function values from a table. The desired function values are the function values at the coordinates of the vertices of the extracted polyhedron.

After the processes of subdivision and extraction have been implemented, the actual interpolation process is conducted. The interpolation operation takes the sample points extracted from the table and uses the function value at these points together with the coordinates of the target evaluation point as inputs for a process which produces the approximate value of the function.

One prior art technique for converting selected points in the domain of a function to values in a function range is known as trilinear interpolation. In the environment of a function, F, having a three-dimensional input domain, the domain is completely filled with rectangular solids. This process is implemented by selecting a series of points along each axis, for example, the x, y, and z axes, as follows: $(x_0, x_1, x_2, \ldots x_a)$, $(y_0, y_1, Y_2, \ldots y_b)$, and $(z_0, z_1, z_2, \ldots z_c)$. These series are chosen such that $x_i=x_0+i*(x_a-x_0)/a$, $y_j=y_0+j*(y_b-y_0)/b$, and $z_k=z_0+k*(z_c-z_0)/c$. In this manner, the sample points are $(x_i, y_j, z_k)$ for $0 \leq i \leq a$, $0 \leq j \leq b$, and $0 \leq k \leq c$. Prior to the step of function approximation, the value of the function $F(x,y,z)$ is measured at each of these sample points.

To approximate the function at a target evaluation point (r,s,t) arbitrarily selected from the input domain of the function, the following procedure is used. The function is conceptualized as:

$$F(r,s,t) = (1.0 - d_z) \{(1.0 - d_s)\{(1.0 - d_r)F(x_i,y_j,z_k) + d_rF(x_i,y_j,z_{k+1}) +$$

$$d_s\{(1.0 + d_r)F(x_i,y_{j+1},z_k) + d_rF(x_i, y_{j+1},z_{k+1})\}\} +$$

$$d_r\{(1.0 - d_s)\{(1.0 - d_r)F(x_{i+1},y_j,z_k) + d_rf(x_{i+1},y_j,z_{k+1})\} +$$

$$d_s\{(1.0 - d_r)F(x_{i+1},y_{j+1}, z_k) + d_rF(x_{i+1}, y_{j+1},z_{k+1})\}\}$$

where $x_i \leq r \leq x_{i+1}$, $y_j \leq s \leq y_{j+1}$, $z_k \leq t \leq z_{k+1}$, $d_r=(r-x_i)/(x_{i+1}-x_i)$, $d_s=(s-y_j)/(y_{j+1}-y_j)$, and $d_t=(t-z_k)/(z_{k+1}-z_k)$.

With reference to the formulas set forth above, the evaluation of the function at target evaluation point (r,s,t) requires the use of eight different sample points in the interpolation calculations. Furthermore, at least eight multiplications and seven additions are required per approximation. This interpolation process uses rectangular solids for packing, extracts the rectangular solid that encloses the target point, and uses trilinear interpolation of the eight vertices to calculate the approximation.

Some prior art interpolation systems improve upon the basic method of trilinear interpolation by storing values for $d_r$, $d_s$, and $d_t$, and/or values for various combinations of terms in the above formulas. However, even if some of the formula terms are calculated and stored in a table prior to function approximation, the overall computational efficiency of this trilinear interpolation method is limited by the fact that sample values for eight vertices must be used to calculate each approximation. An important factor in determining the overall effectiveness of linear interpolation methods is the packing technique used to divide the function domain. A packing technique which divides the function domain into geometrical volumes having a minimum number of vertices would greatly simplify the required calculations, as compared to the scheme described above which uses eight vertices per interpolation. What is needed is an improved packing technique for dividing the function domain into geometrical volumes. In this manner, the interpolation process will calculate a function approximation using a minimum number of sample points per calculation.

One exemplary prior art interpolation process which reduces the number of vertices required for a function approximation is described in U.S. Pat. No. 4,477,833 issued to Clark. For purposes of explanation, it is assumed that the function domain is partitioned into unit divisions in each dimension, such that $x_{i+1}-x_i=1$. The domain packing algorithm of Clark uses rectangular solids in a manner substantially identical to that of the standard trilinear method described above. The polyhedral extraction algorithm disclosed in Clark returns four sample points per target evaluation point. The four sample points are a subset of the eight points returned in the standard trilinear method.

The four sample points used in the Clark method are chosen as follows for a target evaluation point (r,s,t). Let ($x_i$, $y_j$, $z_k$) be the sample point such that $x_i \leq r \leq x_{i+1}$, $y_j \leq s \leq y_{j+1}$, and $z_k \leq t \leq z_{k+1}$. Define $d_r$ as $(r-x_i)/(x_{i+1}-x_i)$, $d_s$ as $(s-y_j)/(y_{j+1}-y_j)$, and $d_t$ as $(t-z_k)/(z_{k+1}-z_k)$. Then, $d_r$, $d_s$, and $d_t$ are used to determine the dominant component, i.e., the maximum d, and the second dominant component. Define "primary" to be the vertex of the subcube enclosing the target point that corresponds to the dominant component, and primeWeight as follows:

primary=($x_{i+1}$, $y_j$, $z_k$) and primeWeight=$d_r$ if $d_r > d_s$ and $d_r > d_t$;

primary=($x_i$, $y_{j+1}$, $z_k$) and primeWeight=$d_s$ if $d_s > d_r$ and $d_s > d_t$;

primary=($x_i$, $y_j$, $z_{k+1}$) and primeWeight=$d_t$ if $d_t > d_r$ and $d_t > d_s$.

Define "secondary" as the corner adjacent to the primary and in the direction of the second dominant component. Consider the definition for primary=($x_{i+1}$, $y_j$, $z_k$) where $d_r$ is the dominant component. Thus:

secondary=($x_{i+1}$, $y_{j+1}$, $z_k$), secondWeight=$d_s$, and lastWeight=$d_t$ if $d_s > d_t$;

secondary=($x_{i+1}$, $y_j$, $z_{k+1}$), secondWeight=$d_t$, and lastWeight=$d_s$ if $d_t > d_s$.

In accordance with the Clark patent, the approximation for the function value is calculated as follows:

$$F(r,s,t) = (1-\text{primeWeight})*F(x_i,y_j,z_k) +$$
$$(\text{primeWeight} - \text{secondWeight})*F(\text{promary}) +$$
$$(\text{secondWeight} - \text{lastWeight})*F(\text{secondary}) +$$
$$\text{lastWeight}*F(x_{i+1},y_{j+1},z_{k+1}).$$

In this manner, the Clark process uses rectangular solids for packing the function domain. An extraction algorithm extracts four sample points, and a directional interpolation algorithm of the four sample points approximates the function value corresponding to a target evaluation point.

The Clark process yields approximation results which contain a certain amount of error. The extent of the error is partially dependent upon the particular extraction method employed, the nature of the function to be approximated, and the domain of interest. Therefore, in some applications, the Clark method may provide acceptable results, whereas, when applied to other applications, the Clark method may prove wholly unsatisfactory. What is needed is a function approximation method which utilizes the relatively low number of sample points employed by the Clark method, yet offers enhanced accuracy as compared to the Clark method.

Another exemplary prior art is U.S. Pat. No. 4,275,413 issued to Sakamoto, et al, which discloses a tetrahedral volumetric interpolation method. This method uses a domain packing algorithm similar to Clark. The extraction process returns 4 points, each of which is a vertex of the rectangular solid or an average of 4 or 8 of the vertices of the rectangular solid. The averaged points are the centers of a face of the rectangular solid (i.e., the average of 4 corners of a rectangle) or the center of the rectangular solid (i.e., the average of the 8 vertices of the rectangular solid).

SUMMARY OF THE INVENTION

The invention provides an improved technique for approximating the value of a function of three variables. The technique employs three steps: a function domain packing step, a polyhedron extraction step, and a volumetric interpolation step. The steps are applied to a mathematical function to calculate an approximation for the function range output value at a point which has been arbitrarily selected from the input domain of the function.

A preferred embodiment of the method for packing a function domain utilizes two interlocked domain subdivisions. A first subdivision and a second subdivision each divide the domain space into rectangular geometric constructs. Each subdivision is accomplished by means of a plurality of planes of constant value corresponding to each of the input dimensions. The first subdivision commences at the lowest value for the domain along each axis, and subdivides the domain along that axis into intervals of equal size. The second subdivision uses the same size rectangular solids as were used for the first subdivision, but commences at the center of the rectangular geometric construct closest to the low end of the domain in each dimension. Thus, the vertices of the second subdivision are at the centers of the rectangular geometric constructs formed by the first subdivision. The geometric constructs formed by the first and second subdivisions are rectangular solids.

After a function domain has been subdivided according to the packing method described above, a volume is extracted from the function domain space. Extraction is the process of selecting a small number of sample points to be used in computing a given function approximation. The present invention extracts from the function domain space a tetrahedral volume defined by two points from the first subdivision and two points from the second subdivision. Therefore, the method may be referred to as tetragonal disphenoid extraction.

The extraction step commences by accepting an input in the form of the coordinates of a target evaluation point (r, s, t). Each rectangular solid formed by the packing method set forth above includes twelve edges and eight corners. The distance from a cube edge to a target evaluation point is defined as the length of a line that passes through both the target evaluation point and the edge in a direction perpendicular to the edge. With respect to the rectangular solids formed by the first subdivision, the distance between the target evaluation point and the edges of the rectangular solids is measured to identify the rectangular solid edge closest to the target evaluation point. This edge has two ends formed by two respective corners of a rectangular solid, and each end defines a vertex of the tetrahedron to be extracted. In this manner, two of the four tetrahedron vertices are determined with reference to the first subdivision.

The two remaining tetrahedron vertices which have not yet been specified are determined using the second subdivision. From the second subdivision, the rectangular solid edge closest to the target evaluation point is identified, using the procedure similar to that described above for the first subdivision. This edge 416 also has two ends formed by respective rectangular solid corners, each end defining a vertex of the tetrahedron to be extracted. Therefore, the second subdivision provides coordinates for the remaining tetrahedra vertices which were not specified with reference to the first subdivision. The two tetrahedron vertices located by the first subdivision and the two vertices located by the second subdivision comprise the four vertices of the extracted tetrahedron.

The third step of the invention includes a function approximation process using volumetric interpolation. If the function domain is subdivided according to the present invention, a continuous approximation of function range output values will result when the interpolation algorithm to be described below is employed. The interpolation step accepts an input in the form of the coordinates of the tetrahedron vertices and the corresponding function values associated with each of these vertices. Each tetrahedron vertex represents a sample input domain point for the function. These inputs are used to generate an approximate value for the function at the target evaluation point.

The tetrahedral volumetric interpolation step commences by subdividing the extracted tetrahedron into four sub-tetrahedra. The subdivision is implemented by drawing lines from each of the vertices of the extracted tetrahedron to the target evaluation point to form four sub-tetrahedra. After the sub-tetrahedra are formed, the volume of a first sub-tetrahedron is calculated. The volume of the first sub-tetrahedron is determined by using the coordinates of the sub-tetrahedron vertices. Three of the sub-tetrahedron vertices are also vertices of the extracted tetrahedron. The remaining sub-tetrahedron vertex is the target evaluation point. One of the three vertices of the extracted tetrahedron is not included in the sub-tetrahedron. This vertex is termed the opposite vertex. The volume of the first sub-tetrahedron is multiplied by the value of the function at the opposite vertex. This product (constitutes the partial approximation sum for the first sub-tetrahedron.

The volume for the second sub-tetrahedron is calculated, then multiplied by the function value at the opposite vertex, determined with reference to the second sub-tetrahedron. This product is the partial approximation sum for the second sub-tetrahedron. In a similar manner, the volume for the third sub-tetrahedron is calculated and multiplied by the function value at the opposite vertex, determined with reference to the third sub-tetrahedron. This product is the partial approximation sum for the third sub-tetrahedron. Likewise, the volume for the fourth sub-tetrahedron is calculated is multiplied by the function value at the opposite vertex, determined with reference to the third sub-tetrahedron. This product is the partial approximation sum for the fourth sub-tetrahedron.

The four partial approximation sums for the sub-tetrahedra are added together to form a non-normalized approximation sum. The non-normalized approximation sum is normalized to the volume of the extracted tetrahedron. The normalized sum constitutes the approximated value of the function at the target evaluation point.

The volumetric interpolation process set forth above uses the following formula:

$$\text{Approximation Result} = (1/(V_t)) * \sum_{i=1}^{4} V_i \times F_i$$

where $V_t$ is the volume of the extracted tetrahedron, $V_i$ is the volume of the tetrahedron formed by replacing the coordinates of the $i^{th}$ vertex of the extracted tetrahedron with the coordinates of the target evaluation point and $F_i$ is the stored value of the function at the ith vertex.

BRIEF DESCRIPTION OF THE DRAWINGS

The various features, aspects, and advantages of the present invention will become apparent from the following more particular description thereof, presented in conjunction with the following drawings, wherein.

DETAILED DESCRIPTION OF THE PREFERRED EMBODIMENTS

The present invention sets forth an improved technique for packing a function domain using two interlocked subdivisions. Each subdivision divides the domain space into rectangular solids. The subdivisions are accomplished by means of a plurality of planes of constant value corresponding to each of the input dimensions.

Figure 1:
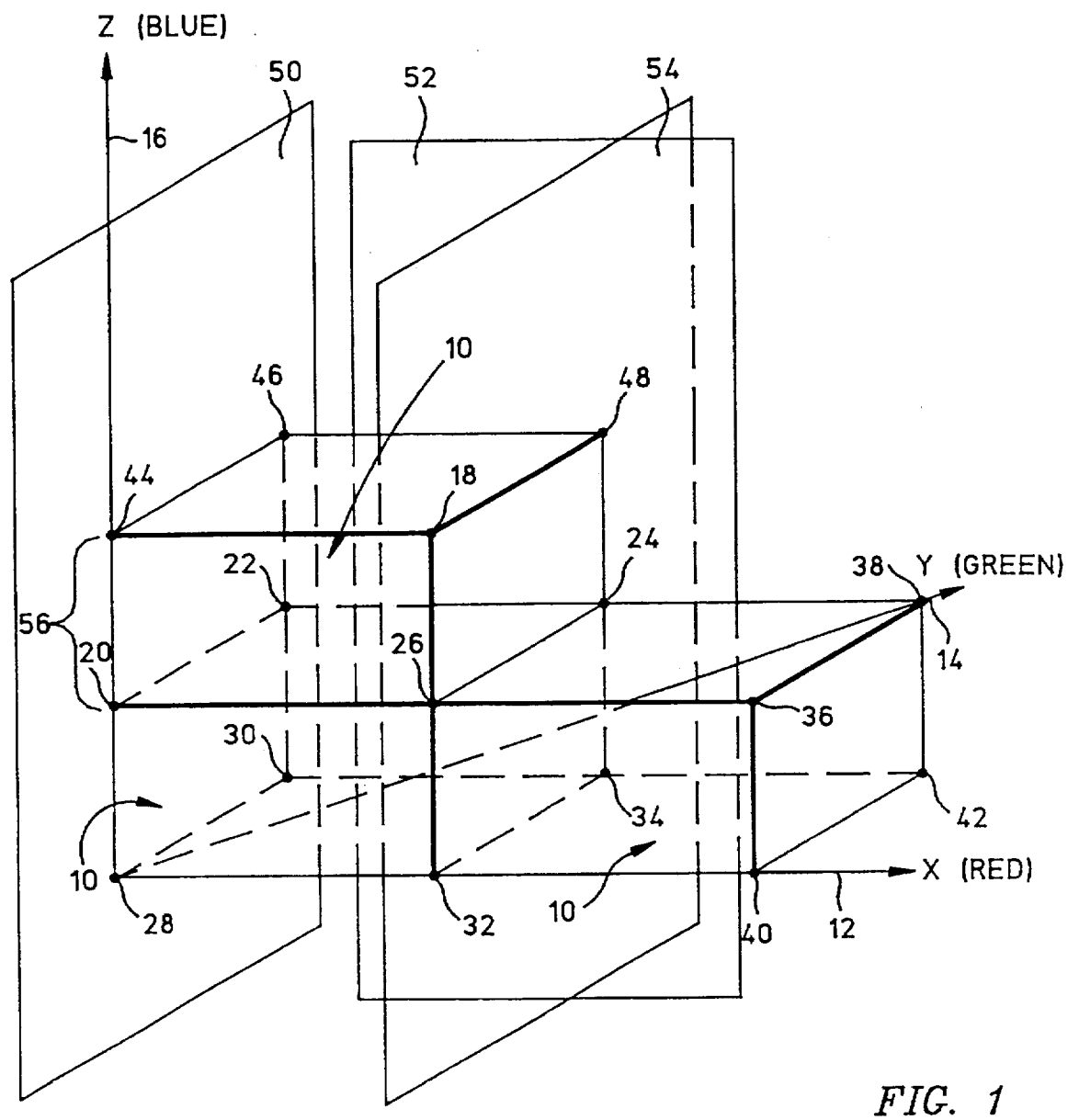
FIG. 1 is a perspective view illustrating the division of the domain of a multivariable mathematical function into rectangular solids.

FIG. 1 illustrates the function domain space for a function having three dimensions. Rectangular solids are defined in this space by a plurality of planes of constant value for each input dimension measured along the x axis 12, the y axis 14, and the z axis 16. The first subdivision commences at the lowest value for the domain along each axis 12, 14, 16, and subdivides the domain along that axis into intervals 56 of equal size. However, the number of subdivisions in each dimension need not be the same. FIG. 1 illustrates two planes 50, 54 of constant value in the x direction and situated along the x axis 12. One plane 52 is shown with a constant value in the y direction along the y axis 14. For planes situated in the same input dimension, such as planes 50 and 54, the planes will be parallel with respect to one another. Planes representing different dimensions, such as planes 52 and 54, will be situated in mutually orthogonal configurations.

The function domain illustrated in FIG. 1 has been divided into rectangular solids 10 of identical size over the entire function domain. However, this is not an absolute requirement. In certain situations, it may be advantageous to divide the function domain into rectangular solids of different volumes. For example, if the function exhibits a sharp curvature in a given region of the domain space, this region may be divided into smaller rectangular solids than the remainder of the function domain, thus providing greater precision in critical domain areas where the function exhibits relatively rapid changes. For the purposes of the present example, the function domain was assumed to be relatively uniform, and, consequently, the function domain was divided into rectangular solids of equal volume.

The second subdivision uses the same size rectangular solids as were used for the first subdivision. However, the second subdivision commences at the center of the rectangular solid closest to the low end of the domain in each dimension. Thus, the vertices of the second subdivision are at the centers of the rectangular solids formed by the first subdivision. Near the boundaries of the function domain, the second subdivision encompasses additional points which are situated either outside of the domain space partitioned by the first subdivision or on the outer faces of the rectangular solids of the first subdivision. If the output value of the function is capable of being determined for input values situated outside of the function domain, then the rectangular grid representing the second subdivision is extended for one additional set of points outside each of the outer faces of the first subdivision. Otherwise, the additional points are the center points of the outer faces of the rectangular solids of the first subdivision. In either case, these additional points are required in order to completely fill the first subdivision with tetrahedra.

Figure 2:
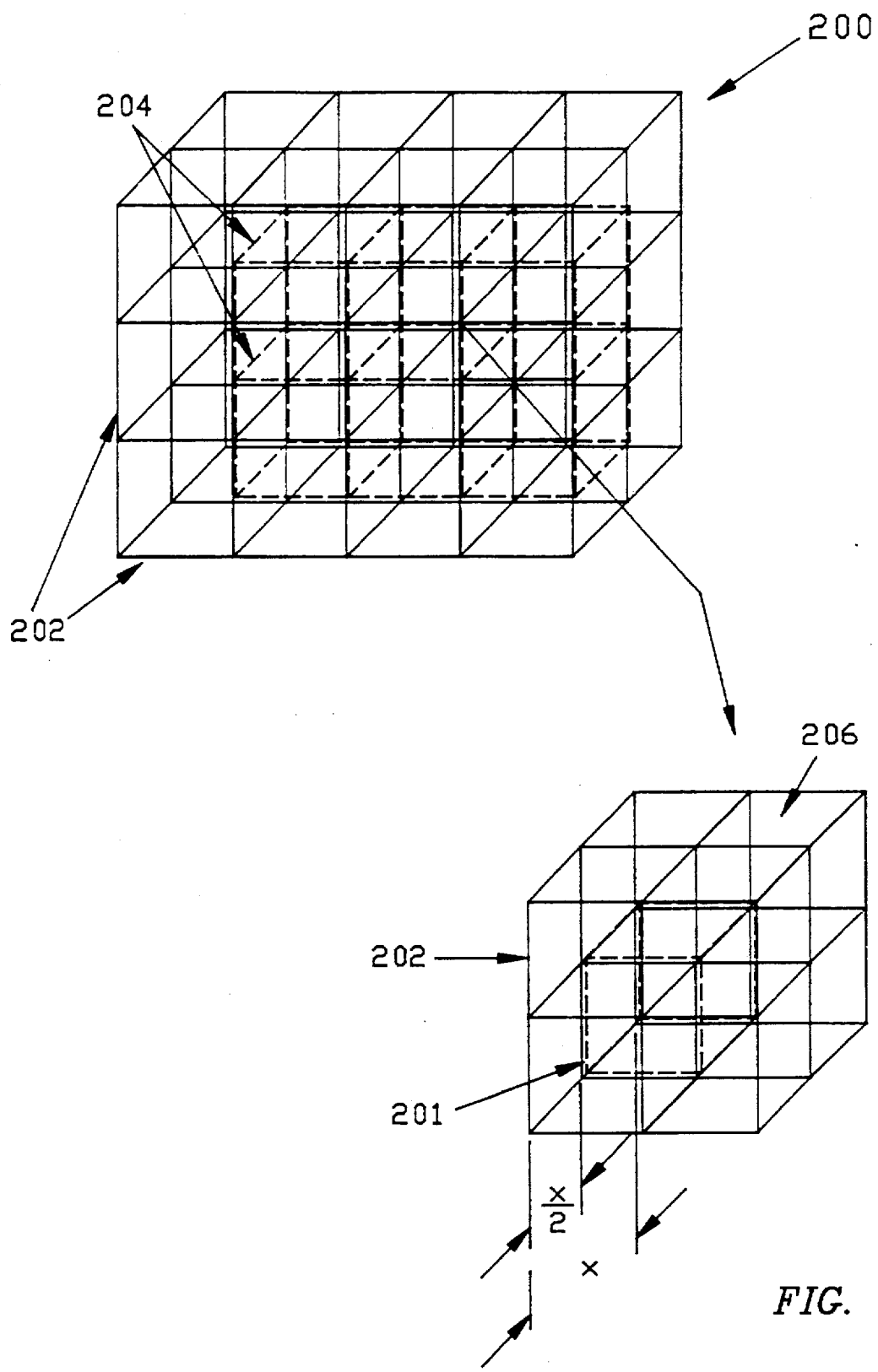
FIG. 2 is a perspective view of a function domain space divided by a first subdivision and a second subdivision.

FIG. 2 illustrates a perspective view of a function domain space 200 divided by a first subdivision 202 and a second subdivision 204. The first subdivision 202 and the second subdivision 204 each comprise three-dimensional grids defining a plurality of rectangular solids. In the case of FIG. 2, the rectangular solids are cubic volumes 206 having edges measuring x units in each dimension. The cubic volumes 206 created by the first subdivision are offset from cubic volumes created by the second subdivision by a factor of x/2 in each dimension.

As discussed previously in conjunction with the background of the invention, the selection of an appropriate packing technique is an important factor in determining the overall effectiveness of the function approximation method. Although packing techniques may be optimized to meet certain specific system applications, it is possible to develop advantageous packing schemes which have general applicability across a broad range of functions and applications. The present invention provides a packing method which offers the aforementioned versatility, and is especially useful in the context of functions used to implement color image processing techniques.

After a function domain has been subdivided according to the packing method described above, the present invention sets forth an improved technique for extracting a volume from the function domain space. Extraction may be defined as the process of selecting a small number of sample points to be used in computing a given function approximation. Since the sample points typically represent polyhedra vertices, extraction refers to the process of identifying the polyhedron containing the arbitrarily selected point for which an approximation is desired. The arbitrarily selected point may be called the target evaluation point. In the context of an interpolation scheme utilizing tables, the extraction process generally involves extracting the desired function values from a table. The desired function values are the function values at the coordinates of the vertices of the extracted polyhedron.

Figure 3:
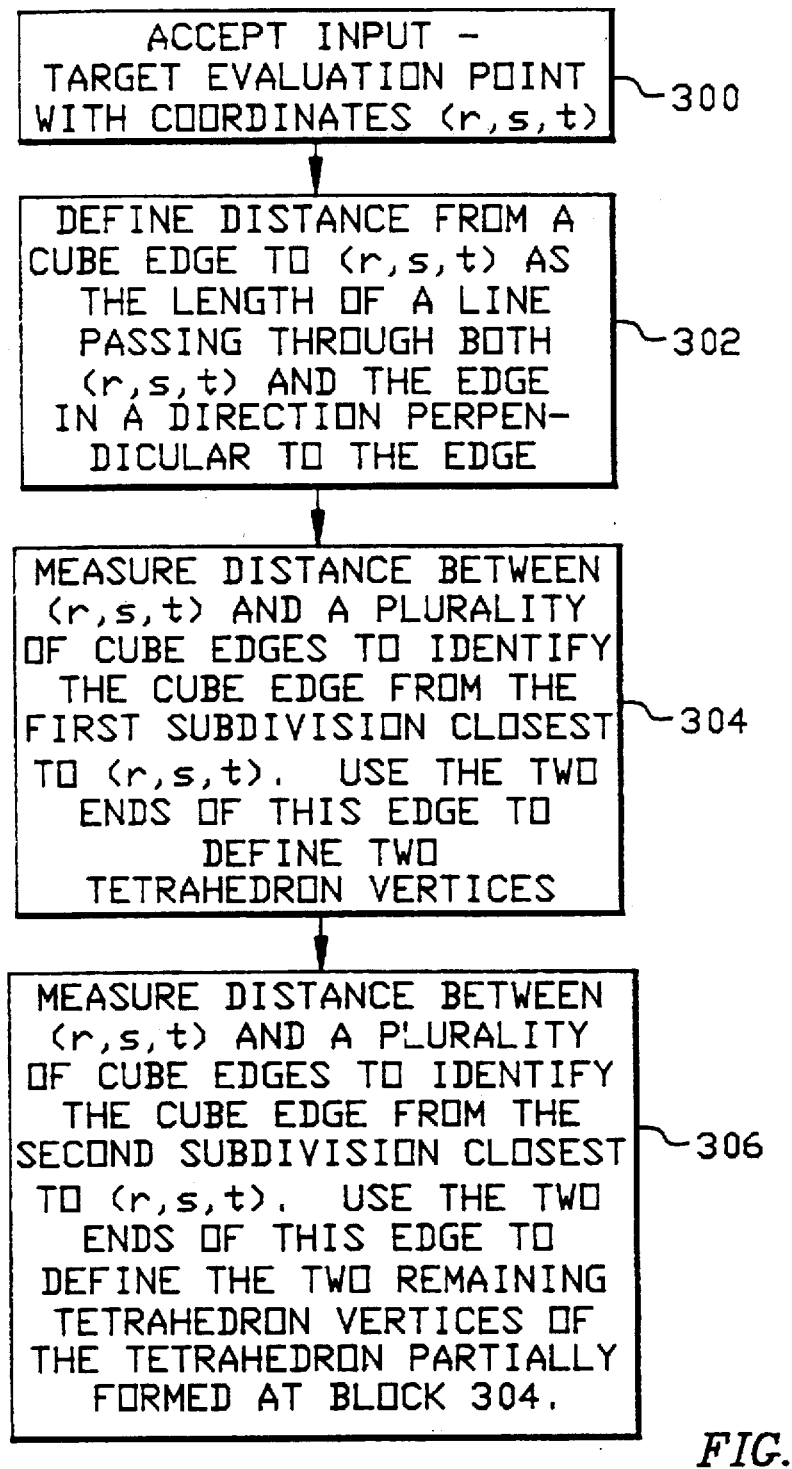
FIG. 3 is a flowchart setting forth a method for extracting the tetrahedral volume according to a preferred embodiment of the invention.

The extraction step of the present invention extracts from the function domain space a tetrahedral volume defined by two points from the first subdivision and two points from the second subdivision. Therefore, the step may be referred to as tetragonal disphenoid extraction. FIG. 3 is a flowchart setting forth a method for extracting the coordinates of a tetrahedron consisting of four vertices, according to a preferred embodiment of the invention. It is assumed that the first and second subdivisions have divided the function domain into cubic volumes. However, the first and second subdivisions do not have to define cubic volumes. The only requirement is that these subdivisions divide the entire function domain into rectangular volumes.

Figure 4:
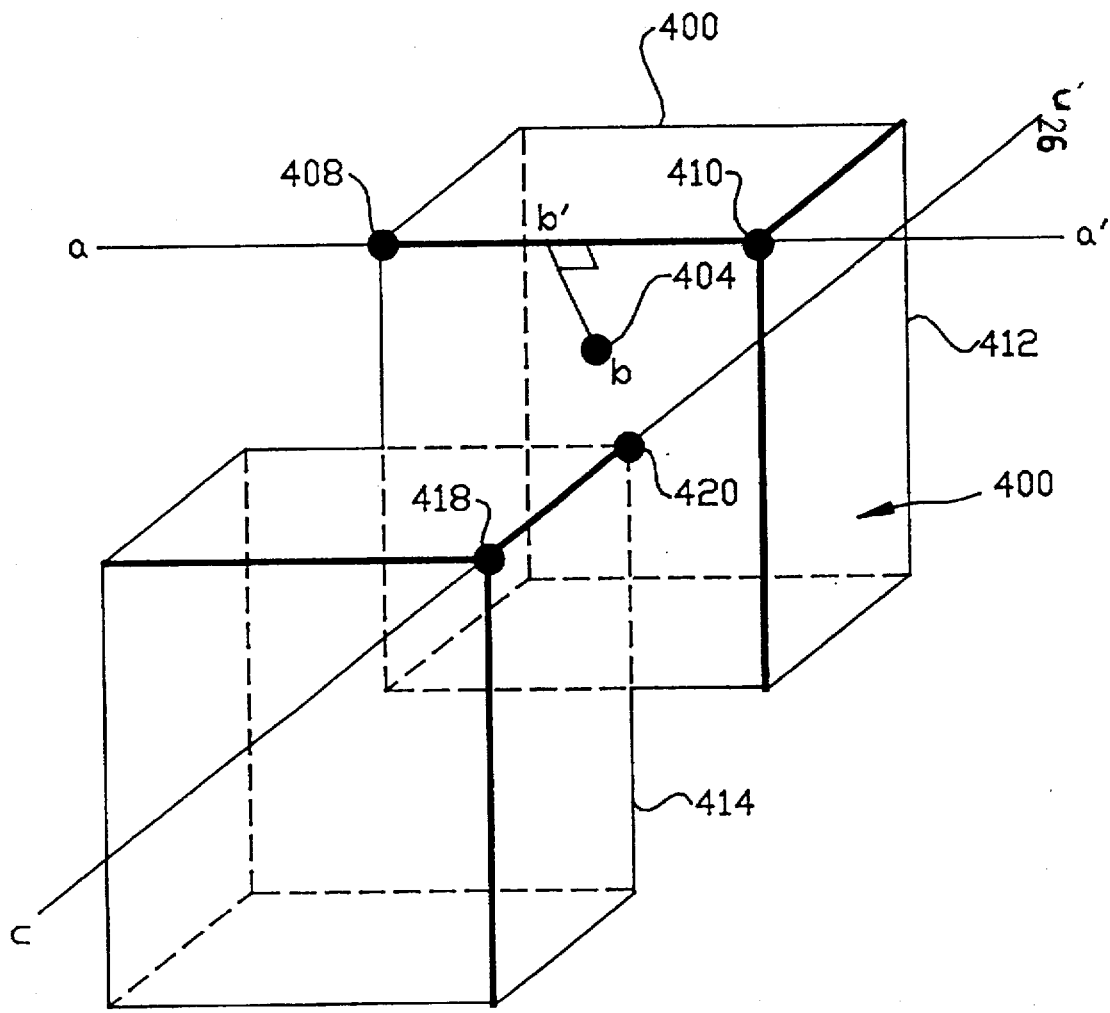
FIG. 4 is a perspective view illustrating a cubic volume formed by an exemplary division of a function domain into cubic solids according to the method of FIG. 3.

The extraction procedure of the present invention commences at block 300, where the procedure accepts an input in the form of the coordinates of a target evaluation point (r,s,t). Next, each cubic volume is conceptualized as including twelve edges and eight corners. An example of such a cubic volume 400 is shown in FIG. 4. The distance from a cube edge a-a' to a target evaluation point 404 is defined as the length of a line b-b' that passes through both the target evaluation point 404 and the edge a-a' in a direction perpendicular to the edge a-a', and this definition is implemented in block 302 of FIG. 3.

From the first subdivision 412 (FIG. 4), the cube edge a-a' closest to the target evaluation point 404 is identified (FIG. 3, block 304). This edge 402 (FIG. 4) has two ends 408, 410 formed by two respective cube corners, each end 408, 410 defining a vertex of the tetrahedron to be extracted. In this manner, two of the four tetrahedron vertices are determined with reference to the first subdivision. The two remaining tetrahedron vertices which have not yet been specified are determined using the second subdivision. From the second subdivision 414, the cube edge c-c' closest to the target evaluation point 404 is identified (FIG. 3, block 306). This edge c-c' also has two ends 418, 420 formed by respective cube corners, each end defining a vertex of the tetrahedron to be extracted. Therefore, two tetrahedron vertices are located by the first subdivision, and two vertices are located by the second subdivision.

Figure 5:
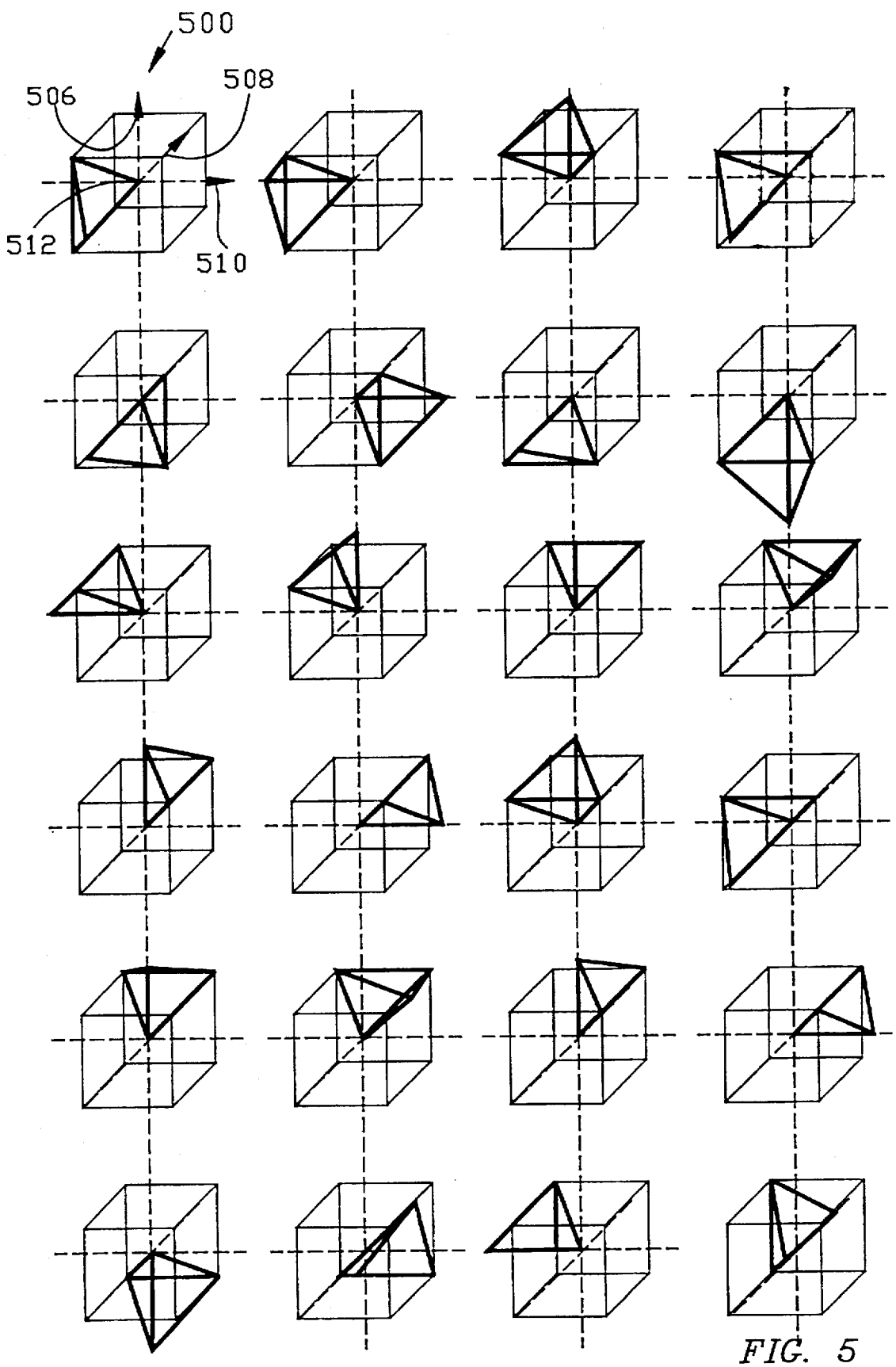
FIG. 5 is a perspective view illustrating exemplary tetrahedral volumes within the cube shown in FIG. 4.

FIG. 5 is a perspective view illustrating all 24 of the tetrahedral volumes within a unit cube 500 formed by the first subdivision, according to the procedure set forth in FIG. 3. The cube 500 includes eight corners and a center point 512 situated at the geometric center of the cube volume. A second subdivision has been applied to the unit cube 500. With respect to a single cube 500 corresponding to the first subdivision, the second subdivision has the effect of subdividing the cube 500 using three mutually orthogonal axes 506, 508, 510, such that all three axes meet at the center point 512 of the cube 500. The vertices of the 24 tetrahedra are formed by various combinations of adjacent vertices of the cube 500, the cube center point 512, and the center point of an adjacent cube. The division of a function domain space into the tetrahedral configurations shown in FIG. 5 will result in a continuous approximation of function range output values when the interpolation algorithm to be described below is employed.

Figure 6A:
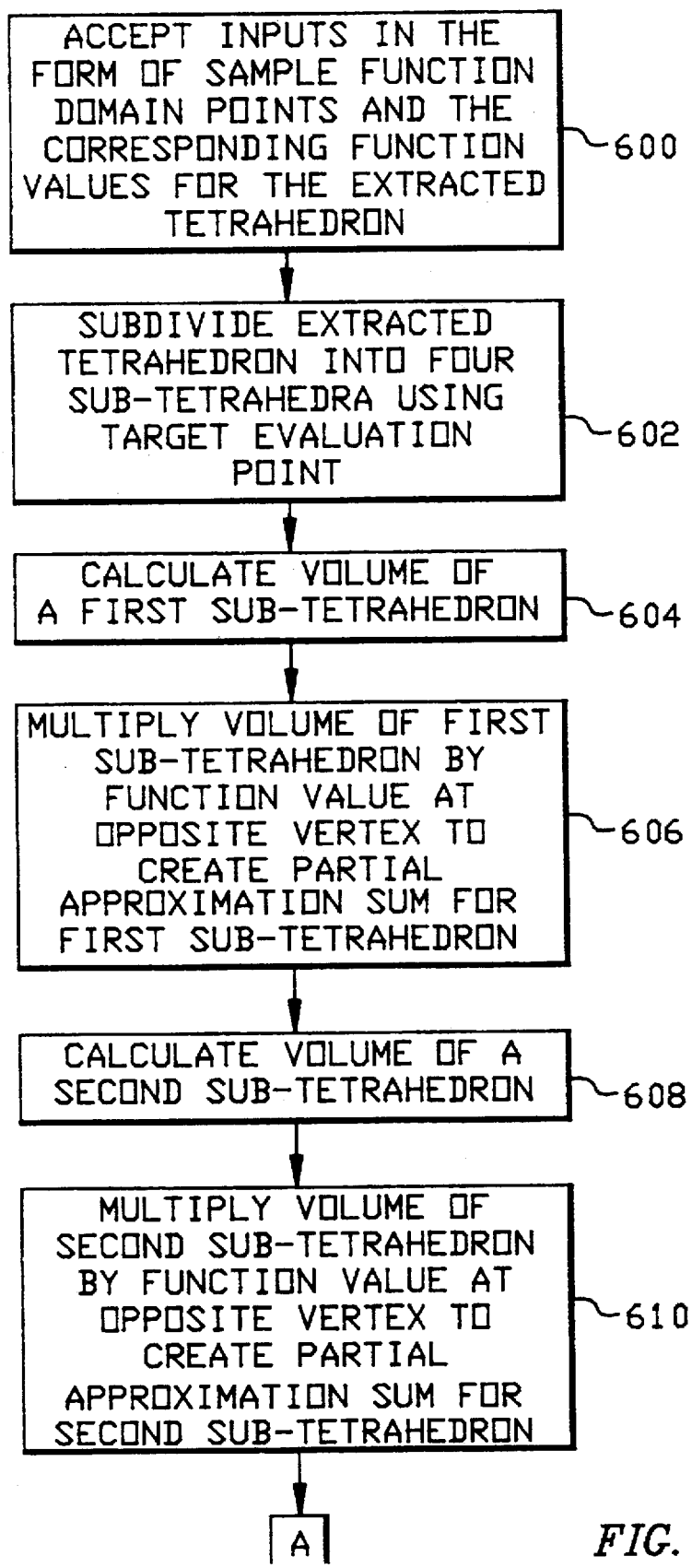
FIGS. 6A and 6B comprise a flowchart setting forth a series of operations for implementing a mathematical interpolation process according to a preferred embodiment of the invention.
Figure 6B:
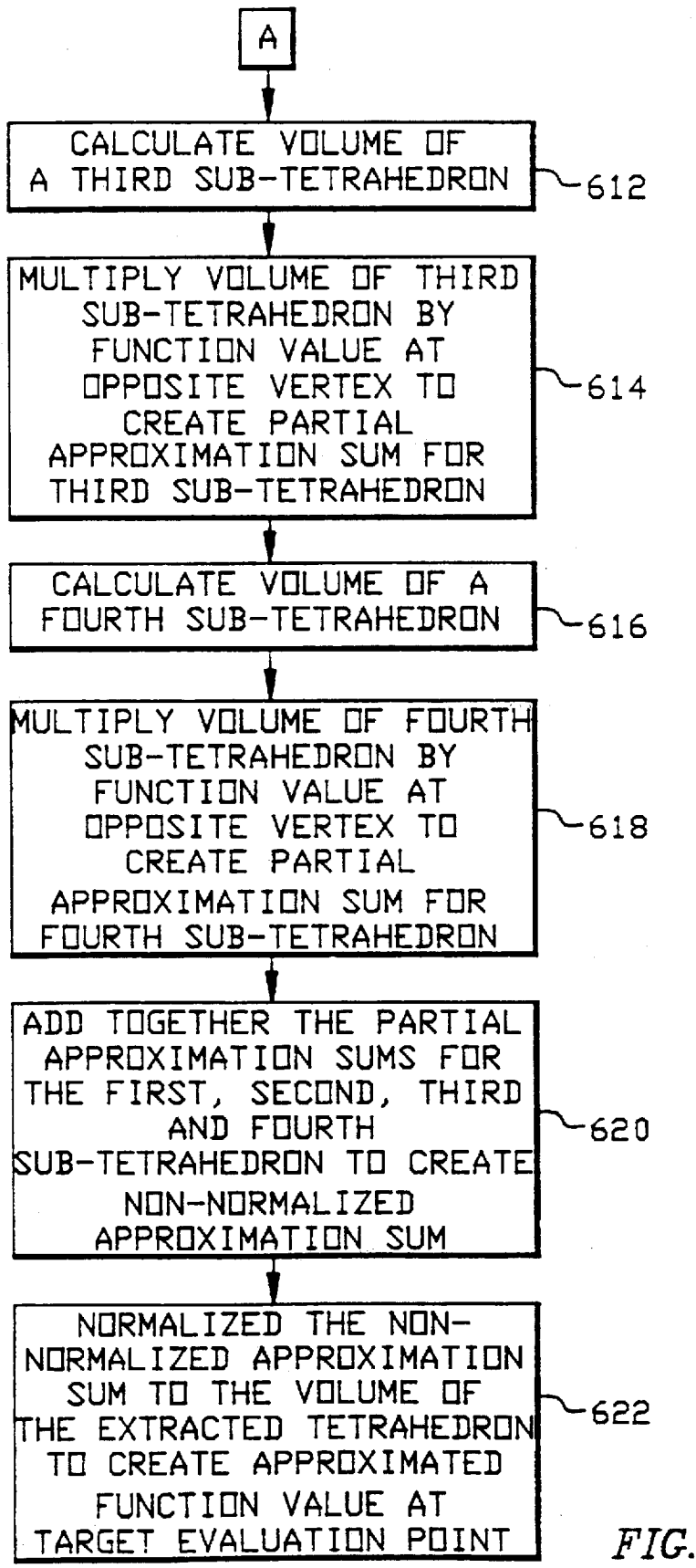

After the processes of domain subdivision and tetrahedron extraction have been implemented, the function approximation method of the present invention conducts the actual mathematical interpolation process, as described in the flowchart of FIGS. 6A and 6B. At block 600, the interpolation process accepts an input in the form of the sample domain points and the corresponding function values which are associated with the extracted tetrahedron. The process uses these inputs to generate an approximate value for the function at the target evaluation point. These domain points and function values are generally organized in the form of one or more tables. The tables are stored in a memory device such as random access memory (RAM).

The process of FIGS. 6A and 6B employs an interpolation technique known as tetrahedral volumetric interpolation. This technique is often selected in preference to other methods of approximating a function because it requires fewer arithmetic operations to compute an approximation. The reduced number of steps required to execute tetrahedral interpolation has important practical consequences, in that less hardware is required, and the computational steps may be implemented faster and more efficiently.

Figure 7:
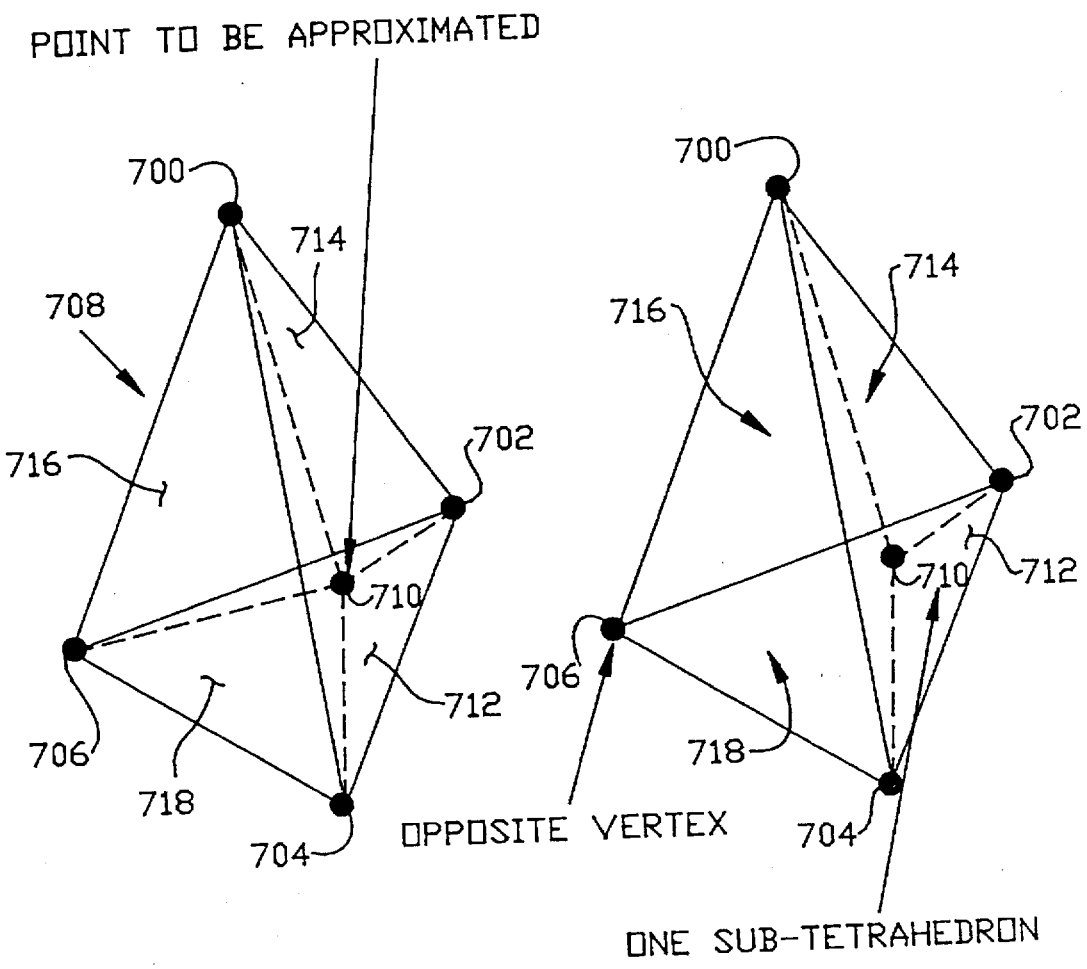
FIG. 7 is a perspective view showing the division of a tetrahedral volume in to four sub-tetrahedra, using the target evaluation point as a reference.

In response to the input received at block 600, the tetrahedral volumetric interpolation process takes the extracted tetrahedron and subdivides it into four sub-tetrahedra (block 602). With reference to FIG. 7, the subdivision is implemented by drawing lines from each of the vertices 700, 702, 704, 706 of the extracted tetrahedron 708 to the target evaluation point 710. In this manner, four sub-tetrahedra 712, 714, 716, and 718 are formed.

After the sub-tetrahedra are formed in block 602, the volume of a first sub-tetrahedron is calculated at block 604. The volume of the first sub-tetrahedron 712 (FIG. 7) is determined by using the coordinates of the sub-tetrahedron 712 vertices. Three of the sub-tetrahedron 712 vertices (700, 702, 704) are also vertices of the extracted tetrahedron 708. The remaining sub-tetrahedron 712 vertex is the target evaluation point 710. Note that one of the three vertices of the extracted tetrahedron 708 is not included in the sub-tetrahedron 712. This vertex is termed the opposite vertex (706). In block 606 (FIG. 6A), the volume of the first sub-tetrahedron 712 (FIG. 7) is multiplied by the value of the function at the opposite vertex. This product constitutes the partial approximation sum for the first sub-tetrahedron 712.

The volume for the second sub-tetrahedron 714 is calculated at block 608 (FIG. 6A). At block 610, the calculated volume is multiplied by the function value at the opposite vertex, determined with reference to the second sub-tetrahedron 714 (FIG. 7). This product is the partial approximation sum for the second sub-tetrahedron 714. In a similar manner, the volume for the third sub-tetrahedron 716 is calculated at block 612 (FIG. 6B). At block 614, the calculated volume is multiplied by the function value at the opposite vertex, determined with reference to the third sub-tetrahedron 716. This product is the partial approximation sum for the third sub-tetrahedron 716. Likewise, the volume for the fourth sub-tetrahedron 718 is calculated at block 616 (FIG. 6B). At block 618, the calculated volume is multiplied by the function value at the opposite vertex, determined with reference to the third sub-tetrahedron 718. This product is the partial approximation sum for the fourth sub-tetrahedron 718.

The partial approximation sums for the sub-tetrahedra 712, 714, 716, 718 as calculated in blocks 606, 610, 614, and 618 (FIGS. 6A and 6B), respectively, are added together at block 620 to form a non-normalized approximation sum. At block 622, the non-normalized approximation sum is normalized to the volume of the extracted tetrahedron 708. The normalized sum determined in block 622 constitutes the approximated value of the function at the target evaluation point 710.

The steps implemented in blocks 604–622 may be summarized in the form of the following formula:

$$\text{Approximation Result} = (1/(V_t)) * \sum_{i=1}^{4} V_i \times F_i$$

where $V_t$ is the volume of the extracted tetrahedron 708, $V_i$ is the volume of the tetrahedron formed by replacing the coordinates of the ith vertex of the extracted tetrahedron 708 with the coordinates of the target evaluation point 710, and $F_i$ is the stored value of the function at the ith vertex.

Preferably the invention operates in the context of a three-dimensional function, with each function component represented by an 8-bit value. The rectangular solids of the function domain are constructed such that there are 16 solids along each component of the domain, i.e., the x axis, the y axis, and the z axis, for a total of 17 planes along each axis. It is assumed that the function is continuous even outside of the domain of interest, and that the function can be evaluated for the sample domain input points as described above in conjunction with packing techniques. These assumptions enable the utilization of a uniform addressing system. If these assumptions are not valid, then the intervals at the domain boundaries must be treated as special cases. If the assumption is valid, each component of each sample point has zeros for the four low order bits.

Figure 8:
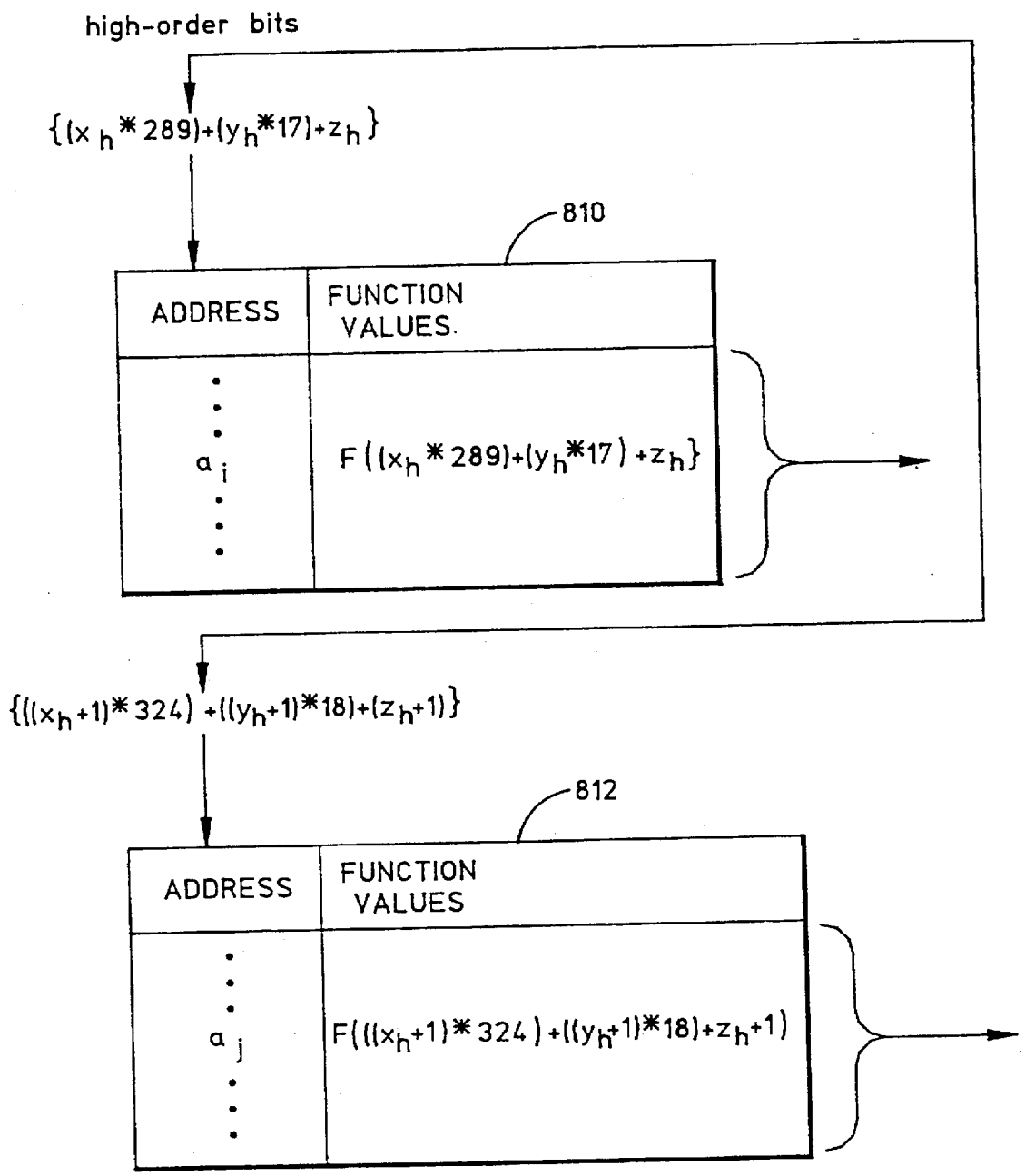
FIG. 8 sets forth the data structures for an F array and a CENTER array respectively which are utilized by the interpolation process of FIG. 6.

The function values at the sample domain points are saved in two one-dimensional linear arrays, F and CENTER, which are illustrated in FIG. 8. The F array 810 saves the function values for the sample domain points from the first subdivision of the function domain. The F array 810 is a linear array with 4,913 entries (17×17×17), and the array is stored in a memory device such as random access memory (RAM). The function values are indexed in memory as follows. Let (x,y,z) be the target evaluation point with x=16 $x_h+x_1$, y=16 $y_h+y_1$, and z=16 $z_h+z_1$, where $x_h$ represents the four high order bits of x, $x_1$ represents the four low order bits of x, and similarly for y and z. Then, the function value of the sample point at the lower corner of the rectangular solid enclosing a point (x,y,z) is addressed using $F((x_h * 289)+(y_h * 17)+z_h)$. The index of F ranges from 0 to 4912.

The CENTER array 820 saves the function values for the sample domain points from the second subdivision of the function domain. The CENTER array 820 is a linear array with 5,832 entries (18×18×18), and the array is stored in a memory device such as random access memory (RAM). The center point of a rectangular solid is addressed using CENTER $(((x_h+1)*324)+((y_h+1)*18)+z_h+1)$, where the index of CENTER ranges from 0 to 5831.

The second subdivision described above in conjunction with FIGS. 1 and 2 requires the inclusion of additional points at the centers of the outer faces of the rectangular solids at the outer limits of the domain, if certain prescribed conditions are met, as was set forth above. If these additional points must be included, then an additional data structure to store these additional points is required. The data structure could be, for example, in the form of a separate linear array, or the additional points could be stored by appending additional elements and indices to the CENTER array 850.

Figure 9:
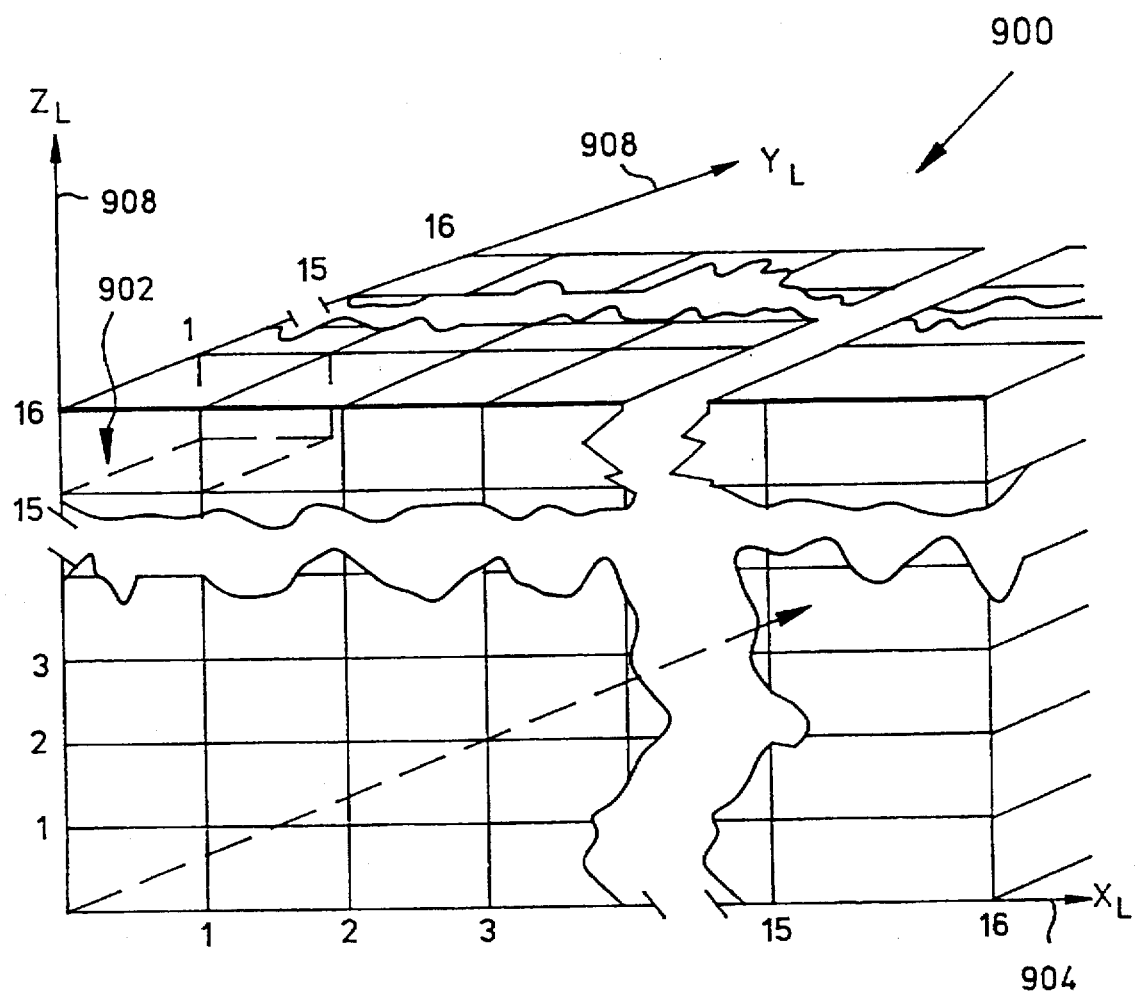
FIG. 9 sets forth the data structure for the WandV array which is utilized by the interpolation process of FIG. 6.

In addition to the F array 810 and the CENTER array 820, the invention employs a third linear array termed the Weights and Vertices (WandV) array. The data structure for the WandV array 900 is shown in FIG. 9. The WandV array 900 is a table of 4096 entries, each containing a structure with four increments and four weights. The WandV array 900 is addressed using WandV $((x_1*256+(y_1*16)+z_1)$, where the index of WandV is in the range of 0 to 4095. The $x_L$ index represents the color red, the $y_L$ index represents the color green, and the $z_L$ index axis represents the color blue. The WandV data structure contains the information for the point with offset $(x_1, y_1, z_1)$ within a given rectangular solid. All points with this offset share the same properties. In this manner, the array need only be computed once, but may subsequently be used often as required to implement many approximations.

The data structure for each element 902 of the WandV array 900 contains the following eight items:

(1) the increment $O_1$, which is added to the value $((x_h*289)+(y_h*17)+z_h)$ to obtain the index within F of the first sample point, a vertex of the tetrahedron.

(2) the increment $O_2$, which is added to the value $((x_h*289)+(y_h*17)+z_h)$ to obtain the index within F of the second sample point, a vertex of the tetrahedron.

(3) the increment $O_3$, which is added to the value $((x_h+1)*324)+((y_h+1)*18)+z_h+1)$ to obtain the index within CENTER of the third sample point, a vertex of the tetrahedron.

(4) the increment $O_4$, which is added to the value $((x_h+1)*324)+((y_h+1)*18)+z_h+1)$ to obtain the index within CENTER of the fourth sample point, a vertex of the tetrahedron.

(5) the weight $W_1$ which is multiplied by the value $F((x_h*289)+(y_h*17)+z_h+O_1)$ to obtain a portion of the final approximation. This value is equal to the volume of the tetrahedron formed using the target offset and the three sample points remaining after excluding the point indexed by $O_1$, divided by the volume of the extracted tetrahedron.

(6) the weight $W_2$ which is multiplied by the value $F((x_h*289)+(y_h*17)+z_h+O_2)$ to obtain a portion of the final approximation. This value is equal to the volume of the tetrahedron formed using the target offset and the three sample points remaining after excluding the point indexed by $O_2$, divided by the volume of the extracted tetrahedron.

(7) the weight $W_3$ which is multiplied by the value CENTER$(((x_h+1)*324)+((y_h+1)*18)+z_h+1+O_3)$ to obtain a portion of the final approximation. This value is equal to the volume of the tetrahedron formed using the target offset and the three sample points remaining after excluding the point by $O_3$, divided by the volume of the extracted tetrahedron.

(8) the weight $W_4$ which is multiplied by the value CENTER$(((x_h+1)*324)+((y_h+1)*18)+z_h+1+O_4)$ to obtain a portion of the final approximation. This value is equal to the volume of the tetrahedron formed using the target offset and the three sample points remaining after excluding the point by $O_4$, divided by the volume of the extracted tetrahedron.

The technique of the present invention calculates the final approximation F (x,y,z) from the WandV array 900, the F array 810 (FIG. 8), and the CENTER array 820 as follows:

$$F(x,y,z) = W\ and\ V(XYZ) \cdot W_1 * F\ \{[(x_H*289) + (y_H*17) + z_H] + W\ and\ V(XYZ) \cdot O_1\} + $$

$$W\ and\ V(XYZ) \cdot W_2 * F\ \{[(x_H*289) + (y_H*17) + z_H] + W\ and\ V(XYZ) \cdot O_2\} + W\ and\ V(XYZ) \cdot$$

$$W_3 * CENTER\ \{((x_H+1)*324) + ((y_H+1)*18) + z_h + 1 + W\ and\ V(XYZ) \cdot O_3) + W\ and\ V(XYZ) \cdot$$

$$W_4 * CENTER\ \{((x_H+1)*324) + ((y_H+1)*18) + z_h + 1 + W\ and\ V(XYZ) \cdot O_4\}$$

Where XYZ=$x_1 * 256+y_1 * 16+z_1$.

Figure 10:
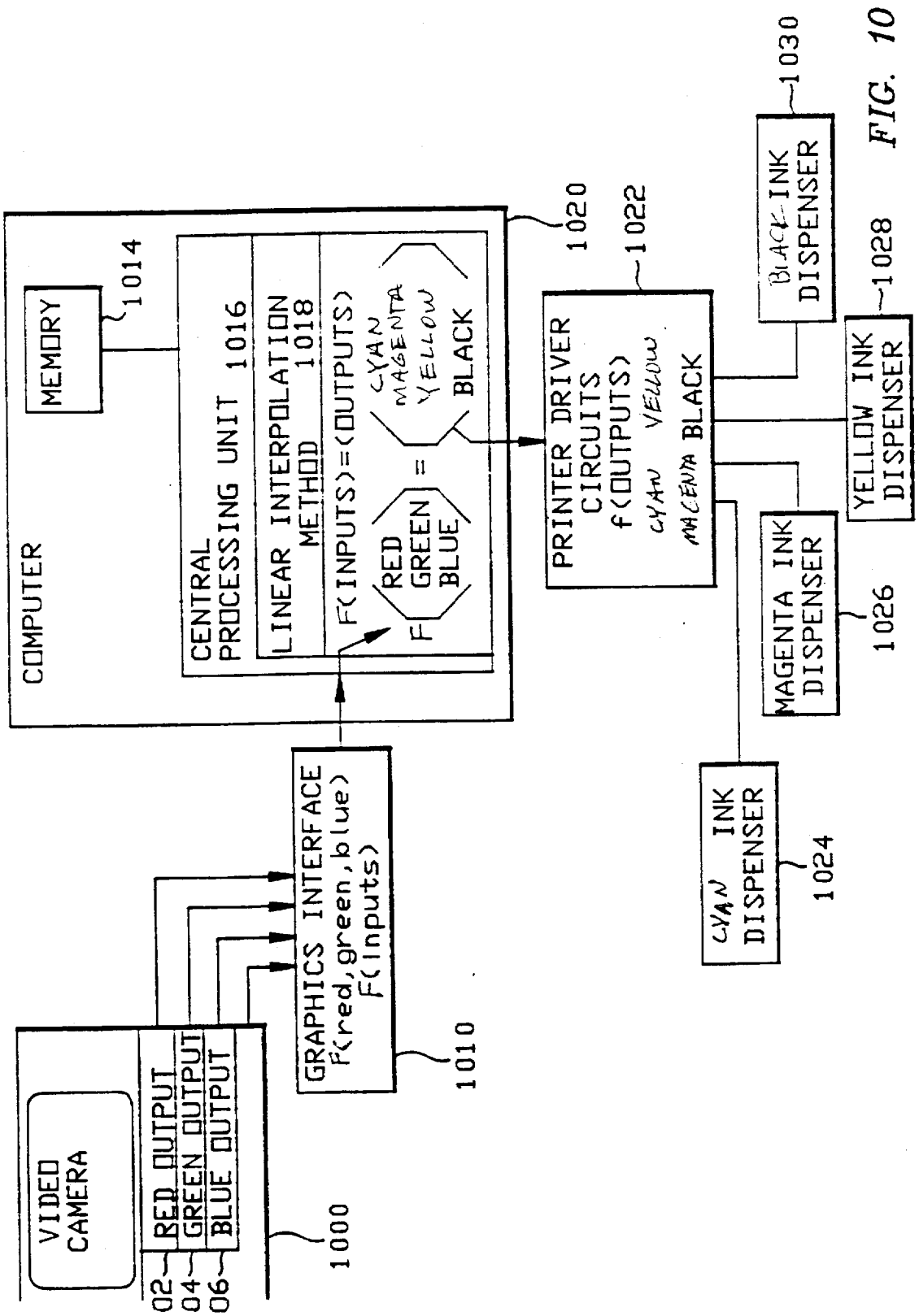
FIG. 10 is a block diagram illustrating the operational hardware environment of a preferred embodiment of the present invention.

The system set forth in FIG. 10 implements the calculations and data manipulations necessary to compute F(x,y,z) according to the formula given above. FIG. 10 is a block diagram illustrating the overall operational environment of a preferred embodiment of the present invention. The volumetric interpolation method 1018 of the present invention is executed by a computer 1020 which includes a central processing unit 1016 with memory 1014. Computer 1020 may be, for example, a simple desktop personal computer, or a large, complex mainframe computer. The central processing unit 1016 is equipped to execute the instructions necessary to implement the linear interpolation method of the invention.

The computer 1020 is coupled to a graphics interface 1010 which in the illustrated example interfaces with a video camera 1000. The video camera 1000 provides a red output 1002, a green output 1004, and a blue output 1006. The outputs are connected to the graphics interface 1010, which converts the outputs into a multivariable mathematical function having input variables of red, green and blue. The mathematical function is fed to the central processing unit 1016, where the linear interpolation method 1018 of the present invention is applied to the function. The output of the linear interpolation method 1018 in the present example is a mathematical function having outputs representing quantities of cyan, magenta, yellow and black. These outputs are fed to printer driver circuits 1022. These circuits control the amount of ink dispensed by cyan, magenta, yellow and black ink dispensers 1024, 1026, 1028, and 1030, respectively.

FIG. 10 shows the invention as being employed in the context of a video camera 1000 and ink dispensers 1024, 1026, 1028, and 1030 for illustrative purposes. For example, a photoluminescent video display screen could be used in place of the video camera 1000. Furthermore, the invention may be employed in contexts other than color image processing, wherever it is desired to approximate the value of a multivariable function.

Figure 11:
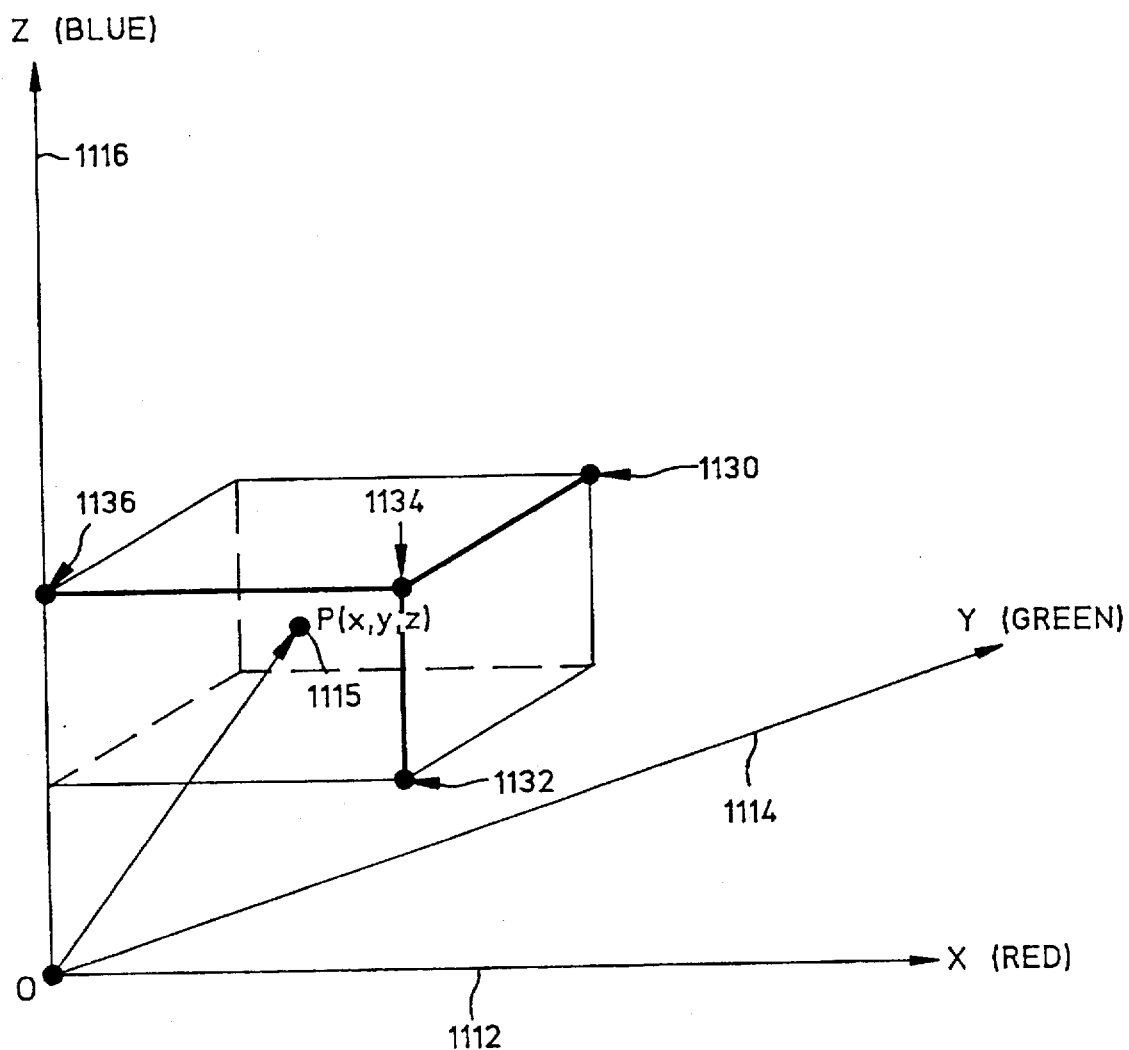
FIG. 11 is perspective view illustrating a point p which, in the environment of a color image processing system, has been selected from the domain of a function F in three-dimensional red-green-blue color space.

FIG. 11 is a three-dimensional graph illustrating a point p 1115 which has been arbitrarily selected from the domain of a function f. The x axis 1112 represents the magnitude of the color red, the y axis 1114 represents the magnitude of the color green, and the z axis 1116 represents the magnitude of the color blue. Allowable values for x, y, and z are in the range of 0 to 100, which defines the domain of the function. Although 8-bit values are frequently employed to represent color components, the function domain is simplified in this example for purposes of illustration. The point p 1115 represents the color of one picture element (pixel) within a given video image specified in additive primary color form.

In the present example, point p 1115 represents a pixel of a color image received by a video camera. Assume that the video camera was aimed at the ocean, resulting in a point p 1115 at a location of x=10, y=50, and z=80, corresponding to a color in the range of cyan to blue. It is desired to convert the video image into a form suitable for newspaper print. The additive primary color representation of the pixel must be converted into a form representing subtractive primary colors. The conversion process may be expressed as a mathematical function with input variables of red, green, and blue, and output values of cyan, magenta, yellow and black.

Since the mathematical function for color conversion is relatively complex, it does not readily lend itself to analytical specification. It would be much more efficient to sample the value of the function at representative points throughout the function domain, and to tabulate these values for future reference. Accordingly, the domain of the function is divided using one of the packing techniques described above, and sample values for the function are taken at the vertices of each tetrahedron. Then, if it is desired to know the value of the function at an arbitrarily selected point p 1115 within the function domain, the value of the function can be interpolated by referring to the known function values at the nearest sample points. This is accomplished by using the extraction process described above to identify the tetrahedron containing the arbitrarily selected point p 1115, and the applying the volumetric interpolation process to the point p 1115 and the extracted tetrahedron to generate a function approximation.

Point p 1115 at the coordinates (10, 50, 80) lies within the tetrahedron having vertices 1130, 1132, 1134, and 1136. The relationship between the additive and subtractive primary colors has been characterized at each of the tetrahedron vertices 1130, 1132, 1134, 1136. For example, assume that vertex 1130 has coordinates of (12, 56, 84) representing respective quantities of red, green, and blue. During the function sampling process, it was determined that these quantities of red, green, and blue correspond to a cyan value of 84, a magenta value of 32 and a yellow value of 12. Similar samples were taken at vertices 1132, 1134, and 1136. The known relationship between function input (red, green, blue) and output (cyan, magenta, yellow) at these vertices 1130, 1132, 1134, 1136 is stored in a table within a memory device such as random access memory. These stored values are then subsequently utilized by the above-described volumetric interpolation procedure to approximate the relationship between function input and output at points where the exact relationship between function input and output is not known.

In the context of FIG. 11, it would be especially advantageous to utilize the packing, extraction, and interpolation processes of the invention as described above. In many state of the art color image processing systems, factors frequently come into play which are not well suited to analytical specification. Accordingly, it is often difficult or impossible to express these factors in terms of a mathematical function. However, the inputs and outputs of these systems are generally easy to observe and to characterize. Volumetric interpolation can be used to empirically approximate the relationship between the system inputs and the system outputs, where it would otherwise be extremely difficult, due to the number and the nature of the variables involved. Considering present state-of-the-art color image processing systems, the relative ease or difficulty by which the function may be approximated oftentimes determines the overall efficiency of the color imaging process. Therefore, it is highly desirable to develop fast, effective methods of linear interpolation.

Figure 12:
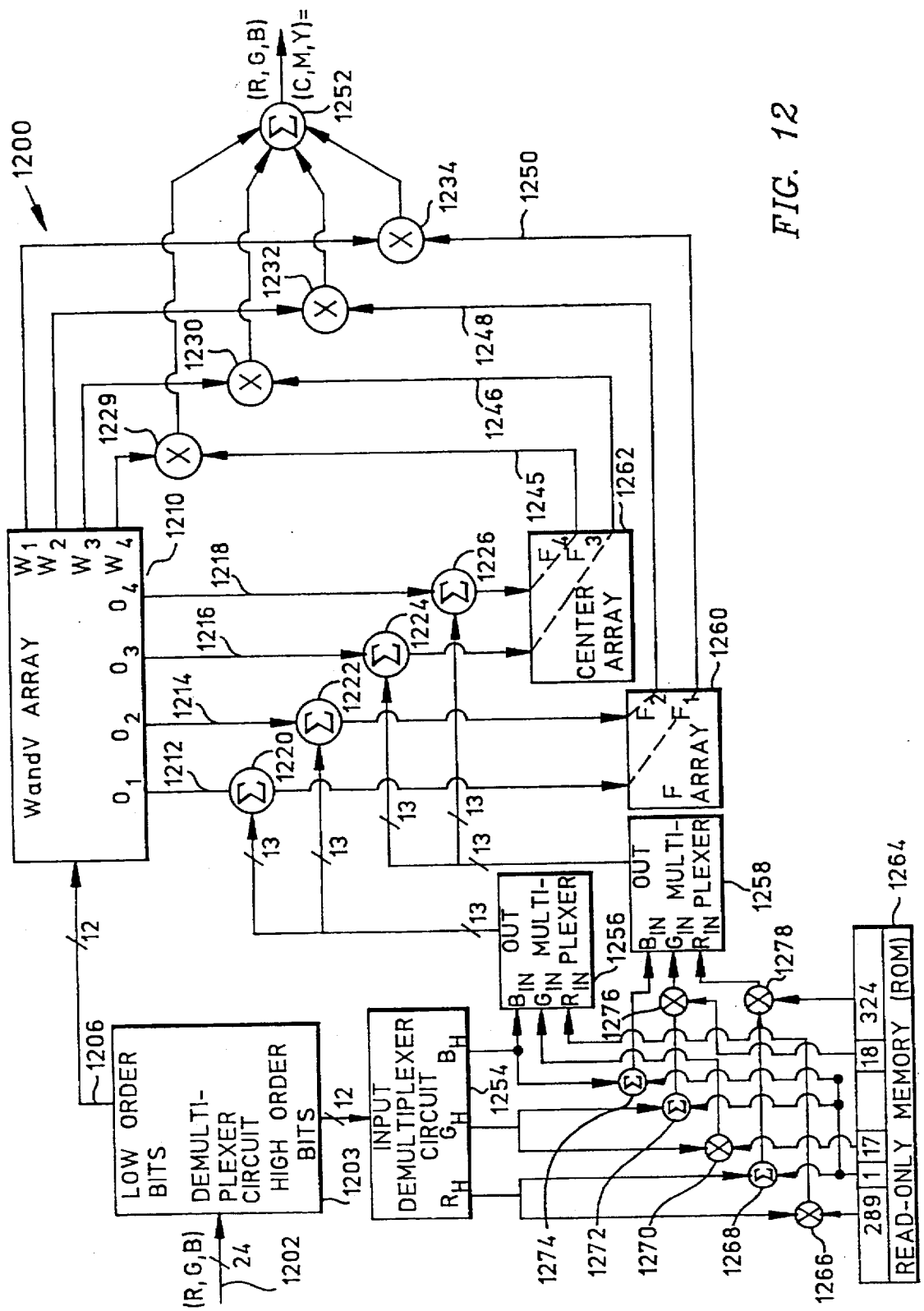
FIG. 12 is a block diagram of an arithmetic apparatus for approximating a function value according to the invention.

FIG. 12 is a functional block diagram illustrating an arithmetic apparatus 1200 for approximating a function value according to a preferred embodiment of the invention. The invention accepts a 24-bit input at input line 1202 in the form of three 8-bit values. The three 8-bit values represent the coordinates of an arbitrarily selected point P within the three-dimensional color space domain of red, green, and blue (RGB). This point is the domain input to a mathematical function which produces an output in the three-dimensional color space range of cyan, magenta, and yellow (CMY).

The apparatus 1200 of FIG. 12 implements a series of operations to approximate the output of the mathematical function in CMY color space, given a function domain input point in RGB color space. The domain of RGB color space is divided as previously described in conjunction with FIGS. 1 and 2. The coordinates of the input point P are expressed in terms of RGB color space, such that, for example, the x coordinate denotes a value for red, the y coordinate denotes a value for green, and the z coordinate denotes a value for blue.

Upon receipt of an arbitrarily selected input point P at input line 1202 from within the domain of RGB color space, the three 8-bit coordinates of the selected point are fed to a first demultiplexer circuit 1203 which separates the 24 input bits into three sets of four low-order bits denoted as $R_L$, $G_L$, and $B_L$, and three sets of four high-order bits denoted as $R_H$, $G_H$, and $B_H$. The bits $R_L$, $G_L$, $B_L$, $R_H$, $G_H$, and $B_H$ correspond to values $X_L$, $Y_L$, $Z_L$, $X_H$, $Y_H$, and $Z_H$, respectively, discussed above in conjunction with FIGS. 8 and 9.

The high-order bits from the first demultiplexer circuit 1203 are fed to a second demultiplexer circuit 1254 where the high-order bits are separated into bits representing the color red ($R_H$), bits representing the color green ($G_H$), and bits representing the color blue ($B_H$). The $R_H$ bits are fed directly to both a first input of a multiplier 1266 and a first input of a summer 1268. A second input of the multiplier 1266 is connected to a read-only memory (ROM) 1264 device, which contains a plurality of memory locations in which are stored various algebraic constants. The ROM 1264 supplies the second input of the multiplier 1266 with a binary value representing the number 289. The ROM 1264 supplies a binary input representing the number 1 to a second input of the summer 1268.

The $G_H$ bits are fed directly to both a first input of a multiplier 1270 and a first input of a summer 1272. A second input of the multiplier 1270 and a second input of the summer 1272 are both connected directly to the read-only memory (ROM) 1264. The ROM 1264 supplies the second input of the multiplier 1270 with a binary value representing the number 17. The second input of the summer 1272 is supplied with a binary value representing the number 1. The $B_H$ bits are fed to a first input of a summer 1274. A second input of the summer 1274 is connected to the ROM 1264. The ROM 1264 supplies the summer 1274 with a binary value representing the number 1.

The output of multiplier 1266 is forwarded to a Red input, $R_{in}$, of a first multiplexer 1256, and the output of multiplier 1270 is forwarded to a Green input, $G_{in}$, of the first multiplexer 1256. The Blue input, $B_{in}$, of the first multiplexer 1256 is connected to the $B_H$ output of the second demultiplexer circuit 1254. The output of summer 1268 is fed to a first input of a multiplier 1278. A second input of multiplier 1278 accepts a binary value representing the number 324 from the ROM 1264. The output of summer 1272 is fed to a first input of a multiplier 1276. A second input of multiplier 1276 accepts a binary value representing the number 18 from the ROM 1264.

The output of summer 1274 is connected to a Blue input, $B_{in}$, of a second multiplexer 1258. The output of multiplier 1276 is connected to a Green input, $G_{in}$, of the second multiplexer 1258, and the output of multiplier 1278 is connected to a Red input, $R_{in}$, of the second multiplexer 1258. The first multiplexer 1256 and the second multiplexer 1258 each perform the function of combining the signals at the $R_{in}$, $G_{in}$, and $B_{in}$ inputs to produce an output in the form of an algebraically-scaled composite RGB signal.

The low-order bits from the first demultiplexer circuit 1203 traverse line 1206 and are used to index the WandV array 1210 which was previously described with reference to FIG. 9. For each input value of $R_L$, $G_L$, and $B_L$, the WandV array 1210 outputs four additive constants $O_1$, $O_2$, $O_3$, and $O_4$, and four multiplicative constants $W_1$, $W_2$, $W_3$, and $W_4$. Additive constant $O_1$ is fed to a first input of a summer 1220 over line 1212. The second input of the summer 1220 receives the algebraically-scaled composite RGB signal prepared from the four high-order bits $R_H$, $G_H$, $B_H$ by the first multiplexer circuit 1256. In a similar manner, additive constant $O_2$ is fed to summer 1222 over line 1214, $O_3$ is fed to summer 1224 over line 1216, and $O_4$ is fed to summer 1226 over line 1218.

The second input of the summer 1222 receives the algebraically-scaled composite RGB signal prepared from the four high-order bits $R_H$, $G_H$, $B_H$ by the first multiplexer circuit 1256. The second input of the summer 1224 and the second input of the summer 1226 both directly receive the algebraically-scaled composite RGB signal prepared from the four high-order bits $R_H$, $G_H$, $B_H$ by the second multiplexer circuit 1258. Each summer 1220, 1222, 1224, and 1226 adds the respective additive constant $O_1$, $O_2$, $O_3$, or $O_4$ to algebraically-scaled representations of the four high-order bits $R_H$, $G_H$, and $B_H$. These high-order bits were algebraically scaled by multipliers 1266, 1270, 1276, 1278, summers 1268, 1272, 1274, and ROM 1264.

The data structure of the WandV array 1210 was described in conjunction with FIG. 9. In the present example, the $x_L$ axis 904 of FIG. 9 represents the color red, and is indexed by respective values of $r_L$ at the output of the demultiplexer circuit 1203. In a similar manner, the $y_L$ axis 906 represents the color green, and is indexed by respective values of $G_L$ at the output of the demultiplexer circuit 1203, and the $z_L$ axis 908 represents the color blue, and is indexed by respective values of $B_L$ at the output of the demultiplexer circuit 1203.

The outputs from summers 1220 and 1222 are used to provide an index input for an F array 1260 which was described above in connection with FIG. 8, and the outputs from summers 1224 and 1226 are used to provide an index input for a CENTER array 1262 (also referred to in the description of FIG. 8). The first summer 1220 output indexes a first function value, $F_1$, from the F array 1260, the second summer 1222 output indexes a second function value, $F_2$, the third summer 1224 indexes a third function value, $F_3$, from the CENTER array 1262, and the fourth summer 1226 indexes a fourth function value, $F_4$.

The first function value, $F_1$, is fed from the F array 1260 to a first input of a first multiplier 1234 over line 1250. Similarly, the second function value, $F_2$, is fed to a first input of a second multiplier 1232 over line 1448. The third function value, $F_3$, is fed from the CENTER array 1262 to a first input of a third multiplier 1230 over line 1246, and the fourth function value, $F_4$, is fed to a first input of a fourth multiplier 1229 over line 1245. The first multiplicative constant, $W_1$, from the WandV array 1210 is fed to a second input of the first multiplier 1234. Likewise, the second multiplicative constant, $W_2$, is fed to a second input of the second multiplier 1232, the third multiplicative constant, $W_3$, is fed to a second input of the third multiplier 1230, and the fourth multiplicative constant, $W_4$, is fed to a second input of a fourth multiplier 1229.

The outputs of the first, second, third, and fourth multipliers 1234, 1232, 1230, and 1229, respectively, are inputted to a summer 1252. The output of summer 1252 represents the output of the arithmetic apparatus 1200. This output is in the form of a function range value representing specific quantities of the colors cyan, magenta, and yellow in CMY color space. The function range value was approximated by the arithmetic apparatus 1200 through the application of a volumetric interpolation process to one or more domain input points in red-green-blue color space.

The multiplicative and additive constants stored in the WandV array 1210, as well as the values contained within the F array 1260 and the CENTER array 1262, take into account the results of empirical observations and measurements. The specific quantities of cyan, magenta, and yellow inks required to match the color of a domain sample value in RGB space is experimentally determined for various domain sample values. The experimental results serve to characterize the relationship between input domain points and range output values for a generally complicated mathematical function. The experimentally characterized function is then used to generate the values which are to be placed into the F array 1260, and the CENTER array 1262. Empirical observations are conducted because the quantities of the inks required to match a predetermined color are generally dependent upon the specific type of paper used. For a given set of interpolation constants, different end results would be obtained, depending upon whether the print media consisted of, for example, newspaper sheets, typing paper, or colored stationary.

Figure 13:
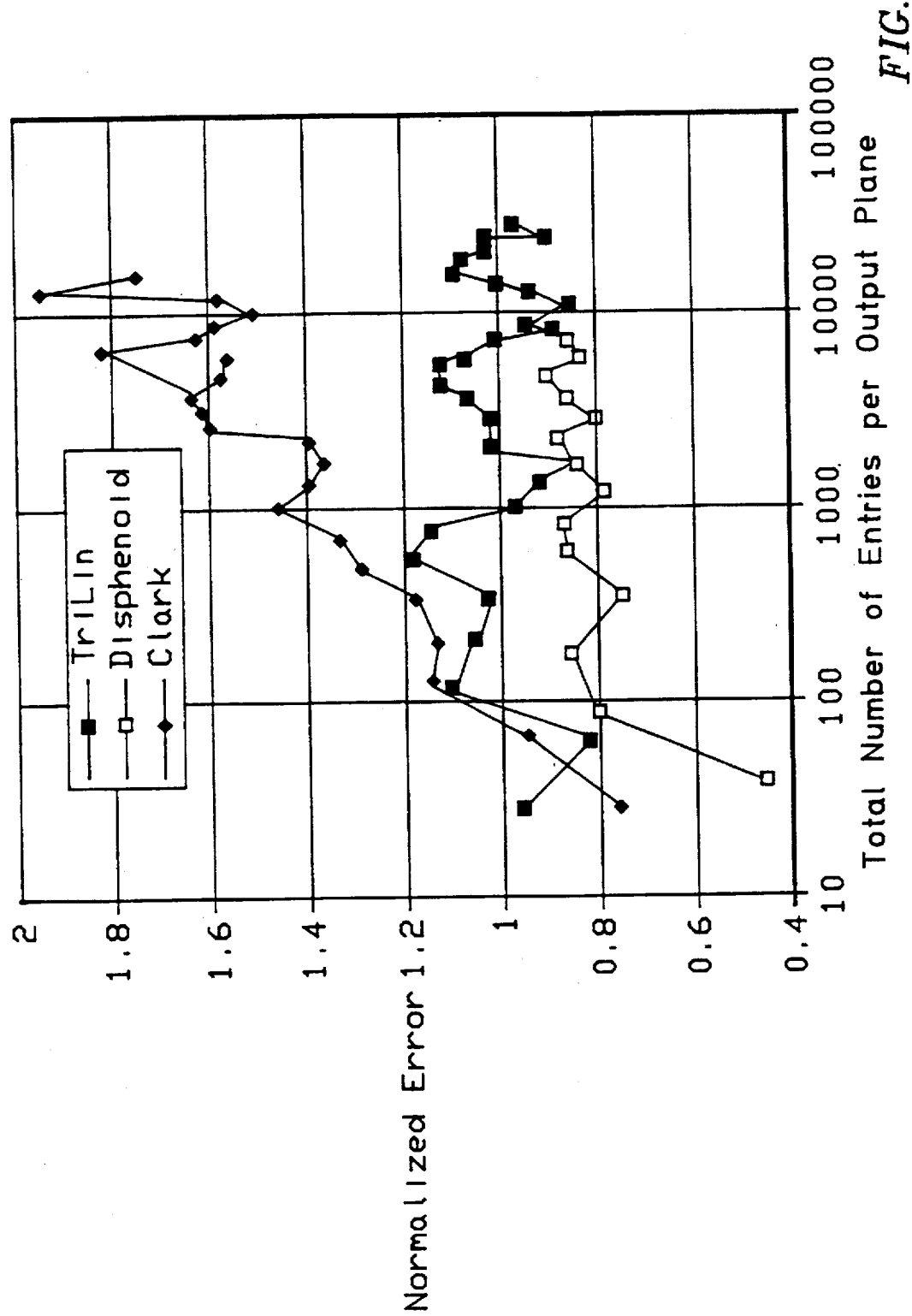
FIG. 13 is a graph showing the relationship between normalized average error ant total number of entries per output plane for the method of the present invention and also for two illustrative prior-art methods.

FIG. 13 is a graph showing the relationship between total number of entries per output plane versus normalized error for the function approximation method of output range values for the three variables, such as cyan, magenta and yellow. The graph reveals the normalized errors in a single output plane for the method of the present invention, as well as for two prior art methods described above in the Background of the Invention. These prior art methods include trilinear interpolation and the interpolation method disclosed in the Clark patent. As stated above, the main shortcoming of the trilinear interpolation method is the relative lack of speed and efficiency, due to the number of mathematical calculations required. Although Clark provides for faster function approximation, the Clark method employs design tradeoffs in the area of approximation accuracy. Note that for the example function the method of the present invention provides error rates significantly lower than those of the Clark method, and comparable to those of the trilinear interpolation method. In this manner, the invention combines the advantages of these prior art systems, i.e., approximation accuracy and efficiency, without sacrificing speed or error performance. An algorithm was devised to test the overall accuracy of these approximation methods by measuring the errors introduced by quantization and manipulation of an artificial image. The algorithm generates a constellation of test points in a standard, visually uniform color space. The points are converted into the source space, which is an arbitrarily selected color space that it is wished to study. The points are quantized in the manner of a perfect analog-to-digital converter of adjustable precision. Then, a conversion operation is performed to convert the points to the target color space, which may be the same color space as the source space. The error between the precise and the quantized conversions is measured to reveal the comparative performance of the respective function approximation techniques.

In the performance measuring algorithm described in the preceding paragraph, it is assumed that the actual images are pre-processed so that maximum and minimum values for each dimension of the color space are linearly mapped to plus and minus full scale of the quantizer. To provide a realistic simulation of this circumstance, a scan through the entire constellation of test points is performed to find the minimum and maximum values for each dimension. The input is normalized to the quantizer using the appropriate values, and the output is denormalized prior to implementing the comparison with the precise conversion.

The test points are selected to represent the average of many scenes in the real world. To generate the artificial scene represented by the constellation of points, reflectances spanning the range of colors naturally occurring in images of the real world were selected and illuminated at three different intensity levels. This selection process was implemented by starting with a cubical grid of points just within the gamut of real surface colors as described in Pointer, M. R., "The Gamut of Real Surface Colours", *Color Research and Application*, 5 (3), 145–155, Fall, 1980. Pointer measured the color coordinates of 4089 nonfluorescent samples, and determined the maximum chroma for a regular progression of lightness and hue-angle. The cubical grid of points is 15 units on a side, resulting in 168 points. The surfaces in the artificial scene are illuminated by three levels of lighting in a ratio of 1:3:10. Computation of the intensity of the reflected light is performed assuming the surface is normal to the imaging lens axis and the illumination is normal to the surface.

For each table size, the methodology for assessing the performance of the present invention populates the table with accurate entries based upon the mathematical relationships between the device-independent representation and the native device space under consideration. The test image is converted using trilinear interpolation, the Clark process, and the method of the present invention. The statistics of the errors are then measured. This image contains points outside of the gamut of the native device space under consideration. It was reasoned that the accuracy of a translation of a point that could not be accurately rendered was of no interest, and so all points in the test image that were outside the device gamut were set to zero. The consequence of setting these points to zero is that the out-of-gamut points affect the statistics only by causing the average error to appear somewhat less than what it would be if the points were not in the image at all. To show each color space at its best, the extent of the tables in each dimension corresponded to the extent of the corresponding dimension of the image that resulted after the out-of-gamut points were zeroed. For the test case, the conversion of an image in a format known as CIELAB was converted to the standard RGB format appropriate for a color monitor with XA11 phosphors and a gamma of 2.2.

Figure 14:
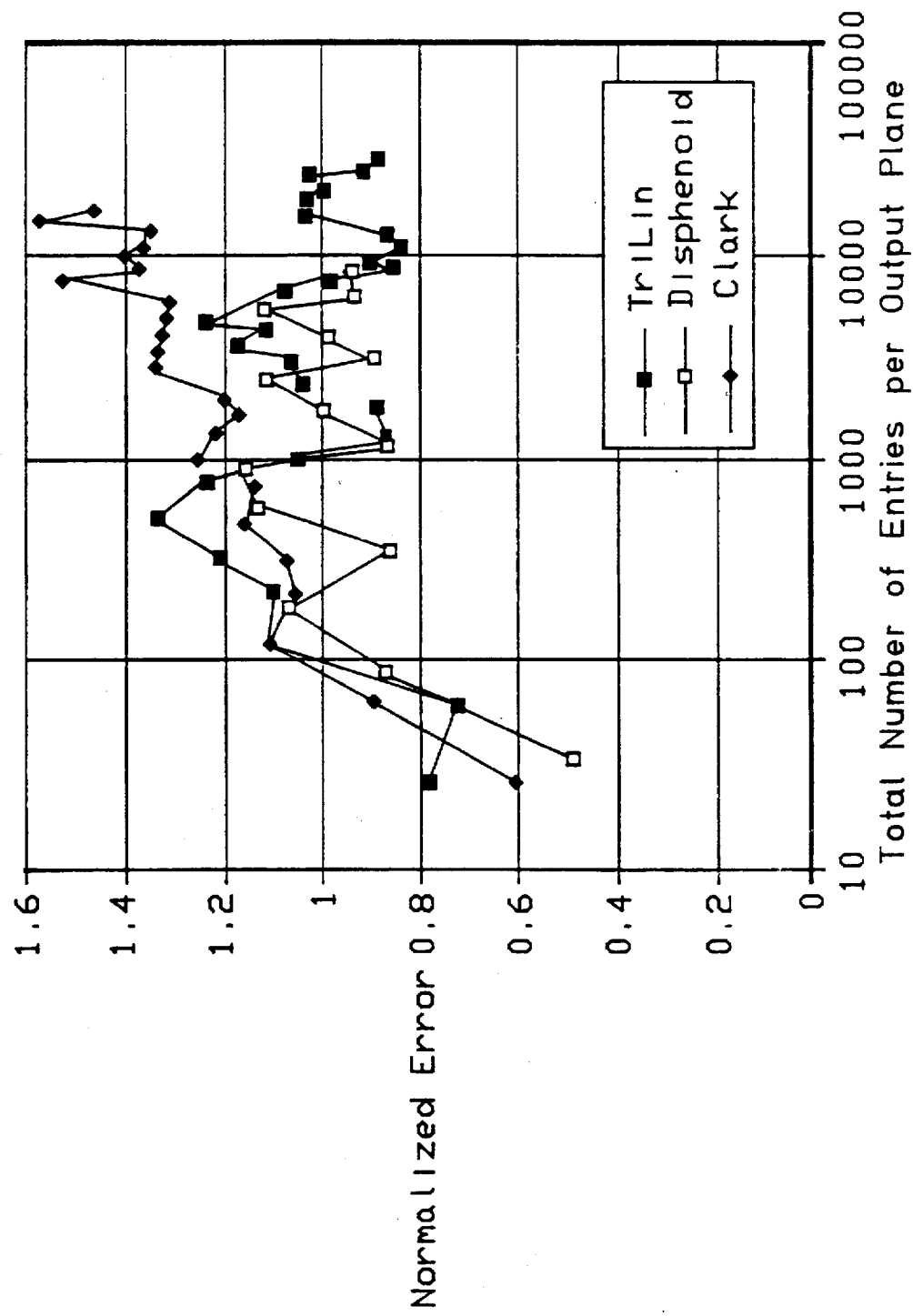
FIG. 14 is a graph showing the relationship between normalized three-sigma error and total number of entries per output plane for the method of the present invention and also for two illustrative prior-art methods.

FIGS. 13 and 14 are graphs showing the interpolation errors which were measured according to the procedure set forth above. FIG. 13 shows the average of the average error for trilinear interpolation ("TriLin"), the Clark process ("Clark"), and the method of the present invention ("Disphensoid"). The X axis of the graph represents the total number of entries per output plane, and the Y axis represents the normalized error. FIG. 14 is identical to FIG. 13, with the exception that the worst of the three-sigma values is illustrated in lieu of average error. The table size value is the total number of table entries required for each technique. As shown in FIGS. 13 and 14, the method of the present invention yields the most accurate results of the methods tested.

A major shortcoming of the trilinear interpolation method is the relative lack of speed and efficiency, due to the number of mathematical calculations required. Although Clark provides for faster function approximation, the Clark method employs design tradeoffs in the area of approximation accuracy. As shown in FIGS. 13 and 14, the method of the present invention yields more accurate results than either the Clark method or the trilinear interpolation method. In this manner, the invention provides approximation accuracy and efficiency, without sacrificing speed or error performance.

A specific embodiment of the invention has been described. Nevertheless, it will be understood that various modifications and changes may be made without departing from the spirit and scope of the invention. For example, the tetrahedral volumetric interpolation algorithm may be replaced by other interpolation algorithms. The requirements on such an algorithm are that the approximation results be continuous across a shared face between two adjacent tetrahedra. An alternative embodiment of the invention would calculate the vertices and volumes of the tetrahedra directly, rather than using the tables described in conjunction with a preferred embodiment of the invention.

The domain packing need not be regular. The function domain may be divided and/or subdivided unequally. It may be advantageous to use smaller rectangular solids in areas of the domain of the function where the function has a high curvature. However, it is necessary that the collection of solids chosen for packing completely fill that part of the function domain for which approximations are desired. The unequal division can be implemented using automatic meshing techniques known to those skilled in the art. These meshing techniques are used to prepare data for analysis using the Finite Element Method of mathematical analysis, which is well known in the art.

The number of intervals, and thus the number of sample points, may be increased or decreased for each component of the domain on a mutually independent basis. Increasing the number of intervals reduces the error of the approximation, while decreasing this number reduces the number of sample points and the storage space required for saving the function values.

The components of the domain may be represented using more or fewer than eight bits. More bits would typically yield a better function approximation, and fewer bits would simplify the required hardware while introducing more error. Each component of the function need not be represented using the same number of bits. It may be advantageous to use more bits for one or more of the components to minimize the approximation error. Similarly, one or more of the domain components may be represented using fewer bits if the approximation errors introduced are not significant.

With respect to the domain packing method of the present invention, the center values for each rectangular geometric construct may be offset from the actual center. This would be useful to better approximate a function with nonuniform curvature within a single rectangular solid. The center values may be selected independently for each rectangular solid, thus decreasing the average or worst case error for the approximation process.

The method of the present invention may be applied to color image processing, and it may also be advantageously applied to other fields where it is desired to compute the value of a multivariable function. Accordingly, it is to be understood that the invention is not to be limited by the specific illustrated embodiments, but only by the scope of the appended claims.

We claim:

1. For a function relating a function domain including a plurality of points in a first color space having three dimensions to a corresponding plurality of function values in an output range in a second color space having m dimensions, each of the three dimensions of the input domain having a corresponding minimum domain value, a method for transforming input pixels having colors in the first color space into output pixels having colors in the second color space by approximating a value of the function corresponding to a target evaluation point selected from the domain input, the method being executable on a combination including a first video image generator including pixels having colors in the first color space, storage means for storing information and processing means for performing calculations, and a second video image generator having colors in the second color space, the method comprising the following steps:

(a) receiving an input pixel from the first video image generator, said input pixel represented by a color in the first color space that corresponds to a pixel evaluation point situated within the function domain;

(b) dividing the function domain into a first division including a plurality of rectangular solids formed by a plurality of parallel planes of constant value in each of the three dimensions of the first color space, division of each of the three dimensions commencing at the minimum domain value, and, for each of the three dimensions, the function domain being divided into intervals of equal size, each rectangular solid having twelve edges, eight corners, and one center point situated midway between all parallel planes of constant value forming the rectangular solid, each of the edges having two ends formed by two respective corners;

(c) dividing the function domain into a second division including a plurality of points such that there is only one point in the interior of each rectangular solid of the first division, the plurality of points of the second division interior to the eight rectangular solids of the first division which share a single common corner from a three-dimensional solid with twelve edges and eight corners;

(d) determining the function value corresponding to each of the corner points of the rectangular solids formed by each of the first division and the second division;

(e) extracting a tetrahedral volume containing the pixel evaluation point from the first and the second divisions, the extracted tetrahedral volume being defined by two points from the first subdivision and two points from the second subdivision, the extracting step being performed as follows:

(e.1) measuring a distance between the pixel evaluation point and any one of the edges from the first plurality of rectangular solids along a line that passes through both the evaluation point and the edge in a direction perpendicular to the edge;

(e.2) repeating step e.1 for a plurality of edges from the first division to identify the edge closest to the pixel evaluation point;

(e.3) for the edge closest to the target evaluation point, identifying two ends of the edge, each of the two ends defining a respective vertex of the tetrahedral volume;

(e.4) measuring the distance between the pixel evaluation point and any one of the edges from the second plurality of rectangular solids along a line that passes through both the pixel evaluation point and the edge in a direction perpendicular to the edge;

(e.5) repeating step e.4 for a plurality of edges from the second division to identify the edge closest to the pixel evaluation point;

(e.6) for the edge closest to the pixel evaluation point, identifying two ends of the edge, each of the ends defining a respective vertex of the tetrahedral volume, such that two tetrahedral volume vertices are defined by the first division, and two tetrahedral volume vertices are defined by the second division;

(f.) deriving an approximation of the function value at the pixel evaluation point from the vertices of the tetrahedral volume identified in step e and the function values corresponding to the vertices, by a volumetric interpolation process; and (g.) using the second video image generator to display an output pixel having a color in the second color space that corresponds to the approximation.

2. A method for converting pixels by approximating the function value as set for the in claim 1 wherein the plurality of points comprising the second division are the plurality of center points of the rectangular solids constructed by the first division of the function domain.

3. A method for converting pixels by approximating the function value as set forth in claim 1 wherein the first color space is red, green, and blue, or cyan, magenta and yellow.

4. A method for converting pixels by approximating the function value as set for the in claim 1 wherein the first color space is a colormetric color space based on tristimulus values.

5. A method for converting pixels by approximating the function value as set forth in claim 1 wherein the second color space is a three-dimensional color space.

6. A method for converting pixels by approximating the function value as set forth in claim 5 wherein the second color space is a red, green, and blue, or cyan, magenta and yellow.

7. A method for converting pixels by approximating the function values as set forth in claim 5 wherein the second color space is a colormetric color space based on tristimulus values.

8. A method for converting pixels by approximating the function value as set forth in claim 1 wherein the second color space is a four-dimensional color space.

9. A method for converting pixels by approximating the function value as set forth in claim 8 wherein the second color space is cyan, magenta, yellow and black.

10. A method for converting pixels by approximating the function value as set forth in claim 1 wherein the components of the first color space are expressed in the form of a multi-bit binary value.

11. A method for converting pixels by approximating the function value as set forth in claim 10 wherein each component of the firs color space is expressed as an 8 bit value having 4 low order bits and 4 high order bits, or 3 low order bits and 5 high order bits, or 5 low order bits and 3 high order bits.

12. A method for converting pixels by approximating the function value as set forth in claim 1 wherein the volumetric interpolation process includes a process for providing a continuous approximation of function range output value for continuous pixel evaluation points, the process comprising:

accepting an input in the form of coordinates of four tetrahedral volume vertices and corresponding function values associated with each of these vertices, each tetrahedral volume vertex representing a sample input domain point for the function;

subdividing the extracted tetrahedral volume into four sub-tetrahedra by projecting lines from each of the tetrahedral volume vertices to the target evaluation point to form a first, a second, a third, and a fourth sub-tetrahedron having respective first, second, third, and fourth sub-tetrahedron vertices such that first, second, and third sub-tetrahedron vertices are also tetrahedral volume vertices comprising three included tetrahedral volume vertices, respective fourth sub-tetrahedron vertices each comprising the target evaluation point, the tetrahedral volume vertex not an included vertex comprising an opposite vertex;

calculating the volume of the first sub-tetrahedron from the coordinates of the four sub-tetrahedron vertices;

multiplying the volume of the first sub-tetrahedron by the function value at the opposite vertex determined with reference to the first sub-tetrahedron to produce a partial approximation sum for the first sub-tetrahedron;

calculating the volume of the second sub-tetrahedron from the coordinates of the four sub-tetrahedron vertices;

multiplying the volume of the second sub-tetrahedron by the function value at the opposite vertex determined with reference to the second sub-tetrahedron to produce a partial approximation sum for the second sub-tetrahedron;

calculating the volume of the third sub-tetrahedron from the coordinates of the four sub-tetrahedron vertices;

multiplying the volume of the third sub-tetrahedron by the function value at the opposite vertex determined with reference to the third sub-tetrahedron to produce a partial approximation sum for the second sub-tetrahedron;

calculating the volume of the fourth sub-tetrahedron from the coordinates of the four sub-tetrahedron vertices;

multiplying the volume of the fourth sub-tetrahedron by the function value at the opposite vertex determined with reference to the fourth sub-tetrahedron to produce a partial approximation sum for the second sub-tetrahedron;

calculating the sum of the partial approximation sums for the first, second, third and fourth sub-tetrahedra to produce a non-normalized approximation sum; and normalizing the non-normalized approximation sum to the volume of the extracted tetrahedron, the normalized sum constituting the approximated function value at the pixel evaluation point.

13. A method for converting pixels by approximating the function value as set forth in claim 1 wherein the storage means is for storing a digital representation of the video image, the digital representation including one or more pixels produced by step (g), the combination further including image display means for displaying the video image, and a printing device, the display means including input means for accepting a colorant signal representative of the video image and at least one of a photoluminescent visual display, the method further including the step of converting the digital representation of the video image into the colorant signals for rendering the digital representation of the color image on at least the photoluminescent visual display and the printing device.

* * * * *